US012803631B2

(12) United States Patent
Li et al.

(10) Patent No.: US 12,803,631 B2
(45) Date of Patent: Nov. 17, 2026

(54) BEAM PAIR PREDICTION AND INDICATION

(71) Applicant: QUALCOMM INCORPORATED, San Diego, CA (US)

(72) Inventors: Qiaoyu Li, Beijing (CN); Yan Zhou, San Diego, CA (US); Sony Akkarakaran, Poway, CA (US); Wooseok Nam, San Diego, CA (US); Tao Luo, San Diego, CA (US); Mahmoud Taherzadeh Boroujeni, San Diego, CA (US); Hamed Pezeshki, San Diego, CA (US); Junyi Li, Greentown, PA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 18/877,907

(22) PCT Filed: Aug. 16, 2022

(86) PCT No.: PCT/CN2022/112684
§ 371 (c)(1),
(2) Date: Dec. 20, 2024

(87) PCT Pub. No.: WO2024/036465
PCT Pub. Date: Feb. 22, 2024

(65) Prior Publication Data
US 2026/0254490 A1 Aug. 27, 2026

(51) Int. Cl.
*H04B 7/06* (2006.01)
*H04L 5/00* (2006.01)

(52) U.S. Cl.
CPC ....... *H04B 7/0617* (2013.01); *H04B 7/06952* (2023.05); *H04L 5/0051* (2013.01); *H04L 5/0091* (2013.01)

(58) Field of Classification Search
CPC ...... H04B 7/088; H04B 7/0696; H04B 7/061; H04B 7/0617; H04B 7/06952; H04L 5/0051; H04L 5/0091; H04W 72/21
See application file for complete search history.

(56) References Cited

U.S. PATENT DOCUMENTS 10,750,398 B2 8/2020 Zhang et al.
2018/0191422 A1* 7/2018 Xia ........................ H04B 7/061
(Continued)

FOREIGN PATENT DOCUMENTS

CN 108633068 A 10/2018
CN 113169777 A 7/2021
(Continued)

OTHER PUBLICATIONS

Huawei, HiSilicon, "Discussion on AI/ML for beam management", R1-2203143, 3GPP TSG RAN WG1 Meeting #109-e, e-Meeting, May 9-20, 2022, pp. 1-7. (Year: 2022).*
(Continued)

*Primary Examiner* — Sophia Vlahos
(74) *Attorney, Agent, or Firm* — QUALCOMM Incorporated

(57) ABSTRACT

Methods, systems, and devices for wireless communications are described. A user equipment (UE) may transmit control signaling indicating parameters for a set of receive beams at the UE. The parameters may be based on an orientation of the UE and a hierarchical beam width configuration of the set of receive beams. The UE may measure one or more reference signals using a first subset of receive beams of a first set of beam pairs based on the parameters. The UE may
(Continued)

transmit one or more measurement reports for the first subset of receive beams based on measuring the one or more reference signals. In some examples, the network entity may transmit a message to activate a receive beam at the UE and indicate a confidence level for the receive beam based on a prediction at the network entity.

30 Claims, 17 Drawing Sheets

(56) References Cited

U.S. PATENT DOCUMENTS

| | | | | |
|---|---|---|---|---|
| 2018/0227024 | A1 | 8/2018 | Xia et al. | |
| 2019/0150133 | A1 | 5/2019 | Li et al. | |
| 2022/0256359 | A1 | 8/2022 | Awoniyi-Oteri et al. | |
| 2024/0348314 | A1 * | 10/2024 | Medra | H04B 7/0617 |
| 2026/0074756 | A1 * | 3/2026 | Rydén | H04B 7/0617 |

FOREIGN PATENT DOCUMENTS

| | | | | |
|---|---|---|---|---|
| WO | WO-2018064348 | A1 | 4/2018 | |
| WO | WO-2023192310 | A1 * | 10/2023 | H04W 24/10 |
| WO | WO-2024035325 | A1 * | 2/2024 | H04B 7/0697 |

OTHER PUBLICATIONS

Nokia, Nokia Shanghai Bell, “Other aspects on ML for beam management”, R1-2204574, 3GPP TSG RAN WG1 #109, e-Meeting, May 9-May 20, 2022, pp. 1-12. (Year: 2022).*

Intel Corporation: “Enhancements on Multi-Beam Operation”, 3GPP TSG RAN WG1 #102, R1-2006950, e-Meeting, Aug. 18, 2020-Aug. 28, 2020, Aug. 9, 2020, pp. 1-17.

International Search Report and Written Opinion—PCT/CN2022/112684—ISA/EPO—Mar. 20, 2023 (2205798WO1).

Moderator (OPPO), et al., “Discussion Summary#2 for Other Aspects on AI/ML for Beam Management”, 3GPP TSG RAN WG1 #109-e, R1-2205253, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, May 17, 2022, 90 Pages, XP052204075, Alt. 5, Alt. 8, p. 63.

Noh S., et al., “Multi-Resolution Codebook and Adaptive Beamforming Sequence Design for Millimeter Wave Beam Alignment”, IEEE Transactions on Wireless Communications, Sep. 2017, vol. 16, No. 9, IEEE, Sep. 1, 2017, pp. 5689-5701, Chapter III Proposed multilevel beamforming framework, Chapter IV “Proposed Codebook Design Technique”, p. 5691-p. 5695, figures 3,6.

Nokia, et al., “Evaluation of ML for Beam Management”, 3GPPTSG RAN WG1 #110, R1-2206970, 3rd Generation Partnership Project, Mobile Competence Centre, 650, Route Des Lucioles, F-06921 Sophia-Antipolis Cedex, France, vol. Ran WG1, No. Toulouse, France, Aug. 22, 2022-Aug. 26, 2022, 312 Aug. 2022, 27 Pages, XP052274907, Section 1 “Introduction”, Section 2.2.1.1.5.1 “Fixed Set B for Training and Testing”, Section“2.3 Further Enhancements on BM Case-1 [. . . ]”, p. 1-p. 22, tables 2.3-3.

Supplementary European Search Report—EP22955247—Search Authority—Munich—Jun. 10, 2026 (2205798EP).

* cited by examiner

1700

BEAM PAIR PREDICTION AND INDICATION

CROSS REFERENCE

The present Application is a 371 national stage filing of International PCT Application No. PCT/CN2022/112684 by Li et al. entitled "BEAM PAIR PREDICTION AND INDICATION," filed Aug. 16, 2022, which is assigned to the assignee hereof, and which is expressly incorporated by reference in its entirety herein.

FIELD OF TECHNOLOGY

The following relates to wireless communications, including beam pair prediction and indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support beam pair prediction and indication. For example, the described techniques provide for enhanced predictive beam management. A user equipment (UE) may report receive beam information of the UE, including practical UE rotation and orientation information and hierarchical levels of receive beam widths. For example, the UE may report beam pointing directions and beam widths for the receive beams of the UE. The UE may measure and report measurements with respect to a first quantity of receive beams or transmit-receive beam pairs. The measured and reported receive beams may be a subset of the total receive beams at the UE. In some examples, the UE may transmit a recommendation of which beams for which the UE is to report measurements and which beams should rely on network-side predictions.

The network entity may activate or indicate a transmission configuration indicator (TCI) state associated with a receive beam or transmit-receive beam pair that the UE is to use to receive a data message at a future time instance or future time window. For example, the network entity may activate a TCI state associated with a predicted receive beam that the UE is to use to receive a downlink shared channel message. In some examples, the network entity may indicate a confidence level for the receive beam or a prediction for the receive beam. In some examples, the UE may perform a measurement using the receive beam and report the measurement if the confidence level is below a threshold.

A method for wireless communications at a UE is described. The method may include transmitting control signaling indicating parameters for a set of receive beams at the UE, the parameters based on an orientation of the UE and a hierarchical beam width configuration of the set of receive beams, measuring one or more reference signals using a first subset of receive beams of a first set of beam pairs based on the parameters, and transmitting one or more measurement reports for the first subset of receive beams based on measuring the one or more reference signals.

An apparatus for wireless communications at a UE is described. The apparatus may include a processor, memory coupled with the processor, and instructions stored in the memory. The instructions may be executable by the processor to cause the apparatus to transmit control signaling indicating parameters for a set of receive beams at the UE, the parameters based on an orientation of the UE and a hierarchical beam width configuration of the set of receive beams, measure one or more reference signals using a first subset of receive beams of a first set of beam pairs based on the parameters, and transmit one or more measurement reports for the first subset of receive beams based on measuring the one or more reference signals.

Another apparatus for wireless communications at a UE is described. The apparatus may include means for transmitting control signaling indicating parameters for a set of receive beams at the UE, the parameters based on an orientation of the UE and a hierarchical beam width configuration of the set of receive beams, means for measuring one or more reference signals using a first subset of receive beams of a first set of beam pairs based on the parameters, and means for transmitting one or more measurement reports for the first subset of receive beams based on measuring the one or more reference signals.

A non-transitory computer-readable medium storing code for wireless communications at a UE is described. The code may include instructions executable by a processor to transmit control signaling indicating parameters for a set of receive beams at the UE, the parameters based on an orientation of the UE and a hierarchical beam width configuration of the set of receive beams, measure one or more reference signals using a first subset of receive beams of a first set of beam pairs based on the parameters, and transmit one or more measurement reports for the first subset of receive beams based on measuring the one or more reference signals.

In some examples of the method, apparatuses, and non-transitory computer-readable medium described herein, transmitting the control signaling may include operations, features, means, or instructions for transmitting the control signaling indicating beam directions for the set of receive beams and beam widths for the set of receive beams based on the orientation of the UE and the hierarchical beam width configuration.

Some examples of the method, apparatuses, and non-transitory computer-readable medium described herein may further include operations, features, means, or instructions for transmitting a control message indicating a change to the orientation of the UE via uplink control information, a medium access control (MAC) control element (CE), or both.

Some examples of the method, apparatuses, and non-transitory computer-readable medium described herein may further include operations, features, means, or instructions for transmitting a message including a recommendation for the UE to report measurements for an initial subset of receive beams and for a network entity to predict measurements for a second subset of receive beams.

Some examples of the method, apparatuses, and non-transitory computer-readable medium described herein may further include operations, features, means, or instructions for receiving, from the network entity, a control message indicating for the UE to report measurements for the first subset of receive beams, where the one or more reference signals may be measured for the first subset of receive beams instead of the initial subset of receive beams based on the control message.

In some examples of the method, apparatuses, and non-transitory computer-readable medium described herein, the first subset of receive beams may be the initial subset of receive beams.

In some examples of the method, apparatuses, and non-transitory computer-readable medium described herein, transmitting the message may include operations, features, means, or instructions for transmitting the message via an uplink control information message, a MAC CE, or a radio resource control (RRC) message.

Some examples of the method, apparatuses, and non-transitory computer-readable medium described herein may further include operations, features, means, or instructions for receiving, based on the one or more measurement reports, a message activating a TCI state for a receive beam of a beam pair to receive a downlink shared channel message.

In some examples of the method, apparatuses, and non-transitory computer-readable medium described herein, receiving the message indicating the TCI state may include operations, features, means, or instructions for receiving the message indicating a confidence level for the receive beam.

Some examples of the method, apparatuses, and non-transitory computer-readable medium described herein may further include operations, features, means, or instructions for measuring a second one or more reference signals using the receive beam based on the confidence level for the receive beam failing to satisfy a threshold and transmitting a measurement report for the receive beam based on measuring the second one or more reference signals.

Some examples of the method, apparatuses, and non-transitory computer-readable medium described herein may further include operations, features, means, or instructions for receiving control signaling indicating a downlink reference signal confidence level.

In some examples of the method, apparatuses, and non-transitory computer-readable medium described herein, the confidence level for the receive beam may be based on a standard deviation of a predicted mean reference signal received power for the receive beam.

In some examples of the method, apparatuses, and non-transitory computer-readable medium described herein, the message includes a time window for communicating using the receive beam of the beam pair.

In some examples of the method, apparatuses, and non-transitory computer-readable medium described herein, the parameters include at least a first set of parameters for a set of wide beams and at least a second set of parameters for a set of narrow beams and one or more narrow beams may be super-positioned with a wide beam.

In some examples of the method, apparatuses, and non-transitory computer-readable medium described herein, the orientation of the UE may be indicated based on a local coordinate system format or a global coordinate system format, or both.

A method for wireless communications at a network entity is described. The method may include receiving control signaling indicating parameters for a set of receive beams at a UE, the parameters based on an orientation of the UE and a hierarchical beam width configuration of the set of receive beams, transmitting one or more reference signals using a first subset of transmit beams of a first set of beam pairs based on the parameters, and receiving one or more measurement reports for a first subset of receive beams based on the one or more reference signals.

An apparatus for wireless communications at a network entity is described. The apparatus may include a processor, memory coupled with the processor, and instructions stored in the memory. The instructions may be executable by the processor to cause the apparatus to receive control signaling indicating parameters for a set of receive beams at a UE, the parameters based on an orientation of the UE and a hierarchical beam width configuration of the set of receive beams, transmit one or more reference signals using a first subset of transmit beams of a first set of beam pairs based on the parameters, and receive one or more measurement reports for a first subset of receive beams based on the one or more reference signals.

Another apparatus for wireless communications at a network entity is described. The apparatus may include means for receiving control signaling indicating parameters for a set of receive beams at a UE, the parameters based on an orientation of the UE and a hierarchical beam width configuration of the set of receive beams, means for transmitting one or more reference signals using a first subset of transmit beams of a first set of beam pairs based on the parameters, and means for receiving one or more measurement reports for a first subset of receive beams based on the one or more reference signals.

A non-transitory computer-readable medium storing code for wireless communications at a network entity is described. The code may include instructions executable by a processor to receive control signaling indicating parameters for a set of receive beams at a UE, the parameters based on an orientation of the UE and a hierarchical beam width configuration of the set of receive beams, transmit one or more reference signals using a first subset of transmit beams of a first set of beam pairs based on the parameters, and receive one or more measurement reports for a first subset of receive beams based on the one or more reference signals.

In some examples of the method, apparatuses, and non-transitory computer-readable medium described herein, receiving the control signaling may include operations, features, means, or instructions for receiving the control signaling indicating beam directions for the set of receive beams and beam widths for the set of receive beams based on the orientation of the UE and the hierarchical beam width configuration.

Some examples of the method, apparatuses, and non-transitory computer-readable medium described herein may further include operations, features, means, or instructions for receiving a control message indicating a change to the orientation of the UE via uplink control information, a MAC CE, or both.

Some examples of the method, apparatuses, and non-transitory computer-readable medium described herein may further include operations, features, means, or instructions for receiving a message including a recommendation for the UE to report measurements for an initial subset of receive beams and for the network entity to predict measurements for a second subset of receive beams.

Some examples of the method, apparatuses, and non-transitory computer-readable medium described herein may further include operations, features, means, or instructions for transmitting, to the UE, a control message indicating for the UE to report measurements for the first subset of receive beams, where the one or more measurement reports may be for the first subset of receive beams instead of the initial subset of receive beams based on the control message.

In some examples of the method, apparatuses, and non-transitory computer-readable medium described herein, the first subset of receive beams may be the initial subset of receive beams.

Some examples of the method, apparatuses, and non-transitory computer-readable medium described herein may further include operations, features, means, or instructions for transmitting, based on the one or more measurement reports, a message activating a TCI state for a receive beam of a beam pair for the UE to receive a downlink shared channel message.

In some examples of the method, apparatuses, and non-transitory computer-readable medium described herein, transmitting the message indicating the TCI state may include operations, features, means, or instructions for transmitting the message indicating a confidence level for the receive beam.

Some examples of the method, apparatuses, and non-transitory computer-readable medium described herein may further include operations, features, means, or instructions for receiving a measurement report for the receive beam based on a confidence level for the receive beam failing to satisfy a threshold.

Some examples of the method, apparatuses, and non-transitory computer-readable medium described herein may further include operations, features, means, or instructions for receiving control signaling indicating a downlink reference signal confidence level.

In some examples of the method, apparatuses, and non-transitory computer-readable medium described herein, the confidence level for the receive beam may be based on a standard deviation of a predicted mean reference signal received power for the receive beam.

In some examples of the method, apparatuses, and non-transitory computer-readable medium described herein, the message includes a time window for the UE to communicate using the receive beam of the beam pair.

In some examples of the method, apparatuses, and non-transitory computer-readable medium described herein, the parameters include at least a first set of parameters for a set of wide beams and at least a second set of parameters for a set of narrow beams and one or more narrow beams may be super-positioned with a wide beam.

DETAILED DESCRIPTION

Figure 1:
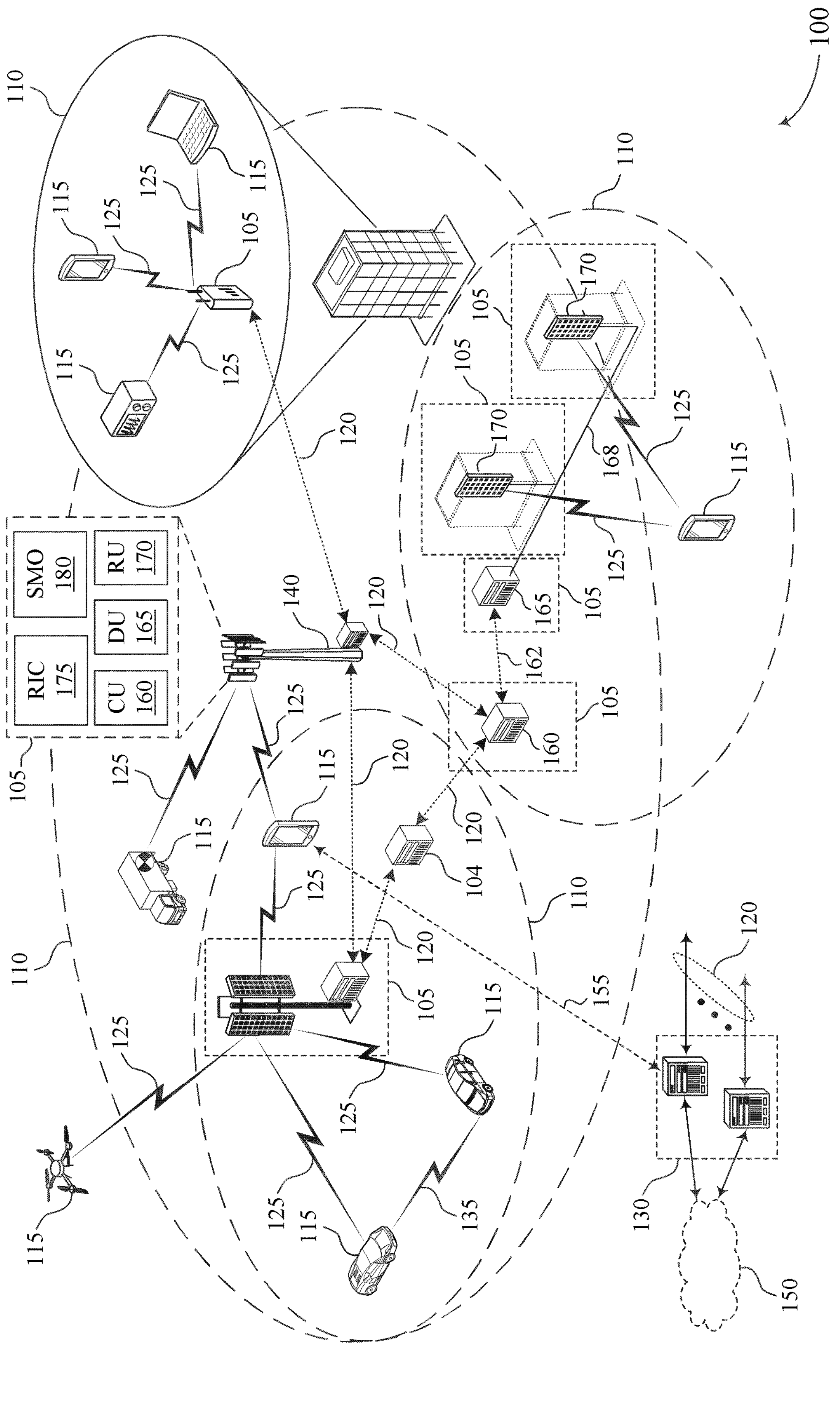
FIG. 1 illustrates an example of a wireless communications system that supports beam pair prediction and indication in accordance with one or more aspects of the present disclosure.

A user equipment (UE) and a network entity may communicate using a beam pair. For example, a network entity may transmit to the UE using a transmit beam of a beam pair, and the UE may receive signaling from the network entity using a receive beam of the beam pair. Some systems may support predictive beam management using artificial intelligence (e.g., machine learning). For example, instead of using measurements to identify a transmit beam and a receive beam of a beam pair, the network entity or the UE may predict beam qualities of transmit beams or receive beams to identify high quality transmit and receive beams for a beam pair. A UE may measure reference signals from a network entity using one or more receive beams at the UE and transmit a measurement report to the network entity based on measuring the reference signals using the receive beams. The network entity may predict beams pairs based on the reported measurements from the UE and activate one or more receive beams or beam pairs at the UE based on the predictions and measurements.

Wireless communications systems described herein support techniques for a UE to provide information to assist predictive beam management. For example, the UE may indicate orientation information for receive beams at the UE. The UE may report receive beam information at the UE, such as a quantity of beams, beam widths, and hierarchical beam information (e.g., information associated with a super-positioning of beams of different beam widths). The UE may report relative beam pointing directions and beam widths based on orientation information of the UE. For example, the UE may report beam pointing directions based on rotation of the UE. In some cases, the UE may transmit signaling indicating updated orientation information of the UE, such as if the orientation of the UE changes, and therefore the directions of the receive beams of the UE change.

In some examples, the UE may transmit signaling indicating a recommendation for which beams should be measured by the UE and which beams should have measurements be predicted by the network entity. For example, among reported receive beams at the UE, the UE may recommend that a first portion of receive beams are measured and reported by the UE, and the UE may recommend that the network entity predicts measurements for a second portion of receive beams. In an example, the UE may recommend that the UE measures and reports measurements for wide beams at the UE, and the network entity predict measurements for narrow beams at the UE.

The network entity may transmit control signaling to activate a transmission configuration indicator (TCI) state for a predicted receive beam at the UE or a predicted transmit and receive beam pair. In some examples, the network entity may indicate a confidence level for the predicted receive beam or beam pair. For example, the network entity may determine a confidence level for an activated TCI state based on measurements and predictions for a receive beam or beam pair associated with the activated TCI state. The confidence level may, for example, correspond to a likelihood that the receive beam or beam pair will provide quality signaling for downlink signaling. If a confidence level for a receive beam is below a threshold, the UE may perform measurements using the receive beam or beam pair and transmit a measurement report indicating the measurements to the network entity. By transmitting the measurement report, the network entity may determine whether the receive beam or beam pair provides sufficient quality communications. For example, the network entity may change an active TCI state or receive beam at the UE if the reported measurements are below a threshold, or the network entity may maintain the active TCI state or receive beam at the UE if the reported measurements satisfy the threshold.

Aspects of the disclosure are initially described in the context of wireless communications systems. Aspects of the disclosure are further illustrated by and described with reference to apparatus diagrams, system diagrams, and flowcharts that relate to beam pair prediction and indication.

FIG. 1 illustrates an example of a wireless communications system 100 that supports beam pair prediction and indication in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support beam pair prediction and indication as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support wireless communications between a UE 115 and a network entity 105 using a beam pair. For example, the network entity 105 may transmit to the UE 115 using a transmit beam, and the UE 115 may receive signaling from the network entity 105 using a receive beam. In some systems, a UE 115 and a network entity 105 may select, or be configured with, a receive beam of a beam pair based on measuring multiple receive beams at the UE 115. For example, the network entity 105 may transmit reference signals to the UE 115 using transmit beam, and the UE 115 may perform multiple measurements using the receive beams of the UE 115 to identify a best (e.g., strongest) receive beam for the beam pair.

For example, a UE 115 may be configured with a reporting quantity, corresponding to a quantity of SSBs for which the UE 115 is to measure and provide measurements. For example, the UE 115 may report reference signal received power (RSRP) measurements or signal-to-interference ratio (SINR) measurements, or both, for one or more SSBs or one or more CSI-RS, or both (e.g., separately or jointly). The UE 115 may report measurements for a configured quantity signals (e.g., SSBs or CSI-RS) for each CSI report configuration. The UE 115 may report an RSRP measurement for a strongest SSB. In some cases, the UE 115 may report RSRP measurements for other SSBs (e.g., next strongest SSB measurements), in some cases using a lower granularity than the RSRP measurement for the strongest SSB. Additionally, or alternatively, the UE 115 may report an SINR of the strongest SSB or CSI-RS. Similarly, the UE 115 may, in some cases, report SINR measurements for other SSBs or CSI-RS (e.g., next strongest SSB or CSI-RS measurements), in some cases using a lower granularity than the SINR measurement for the strongest SSB or CSI-RS.

Some systems may support techniques for predictive beam management. For example, a network entity 105 or a UE 115, or both, may predict non-measured beam qualities using a machine learning model. In some examples, the network entity 105 or the UE 115, or both, may predict future beam blockage or failures. In some examples, predicting future transmit beam qualities may be based on a movement speed or trajectory of the UE 115, receive beams configured or supported by the UE 115, interference, and other factors.

In an example, a network entity 105 may perform time domain beam prediction. The network entity 105 may input a time series of Layer 1 (L1) RSRP measurements for a set of transmit beams (e.g., of the network entity 105) to a machine learning model. The machine learning model may output predicted L1 RSRP measurements for the transmit beams, predicted candidate beams for upcoming time periods, and future beam blockages or beam failures. In some examples, the L1 RSRP measurements may be reported by the UE 115. Similarly, the network entity 105 may perform receive beam predictions based on measurements reported by the UE 115.

The wireless communications system 100, as well as wireless communications described herein, supports techniques for enhanced predictive beam management. For example, the wireless communications system 100 may support a network entity-assisted beam pair prediction framework. A UE 115 may report receive beam information of the UE 115, including practical UE rotation and orientation information and hierarchical levels of receive beam widths. For example, the UE 115 may report beam pointing directions and beam widths for the receive beams of the UE 115. The UE 115 may measure and report RSRP measurements and SINR measurements with respect to a first quantity of transmit-receive beam pairs. The measured and reported receive beams may be a subset of the total receive beams at the UE 115 based on a recommendation from the UE 115 or a configuration received from the network entity 105, or both.

The network entity 105 may activate or indicate a TCI state associated with a receive beam or transmit-receive beam pair that the UE 115 is to use to receive a data message at a future time instance or future time window. For example, the network entity 105 may activate a TCI state associated with a predicted receive beam that the UE 115 is to use to receive a downlink shared channel message. In some examples, the network entity 105 may indicate a confidence level for the receive beam or a prediction for the receive beam. In some examples, the UE 115 may perform a measurement using the receive beam and report the measurement if the confidence level is below a threshold.

Figure 2:
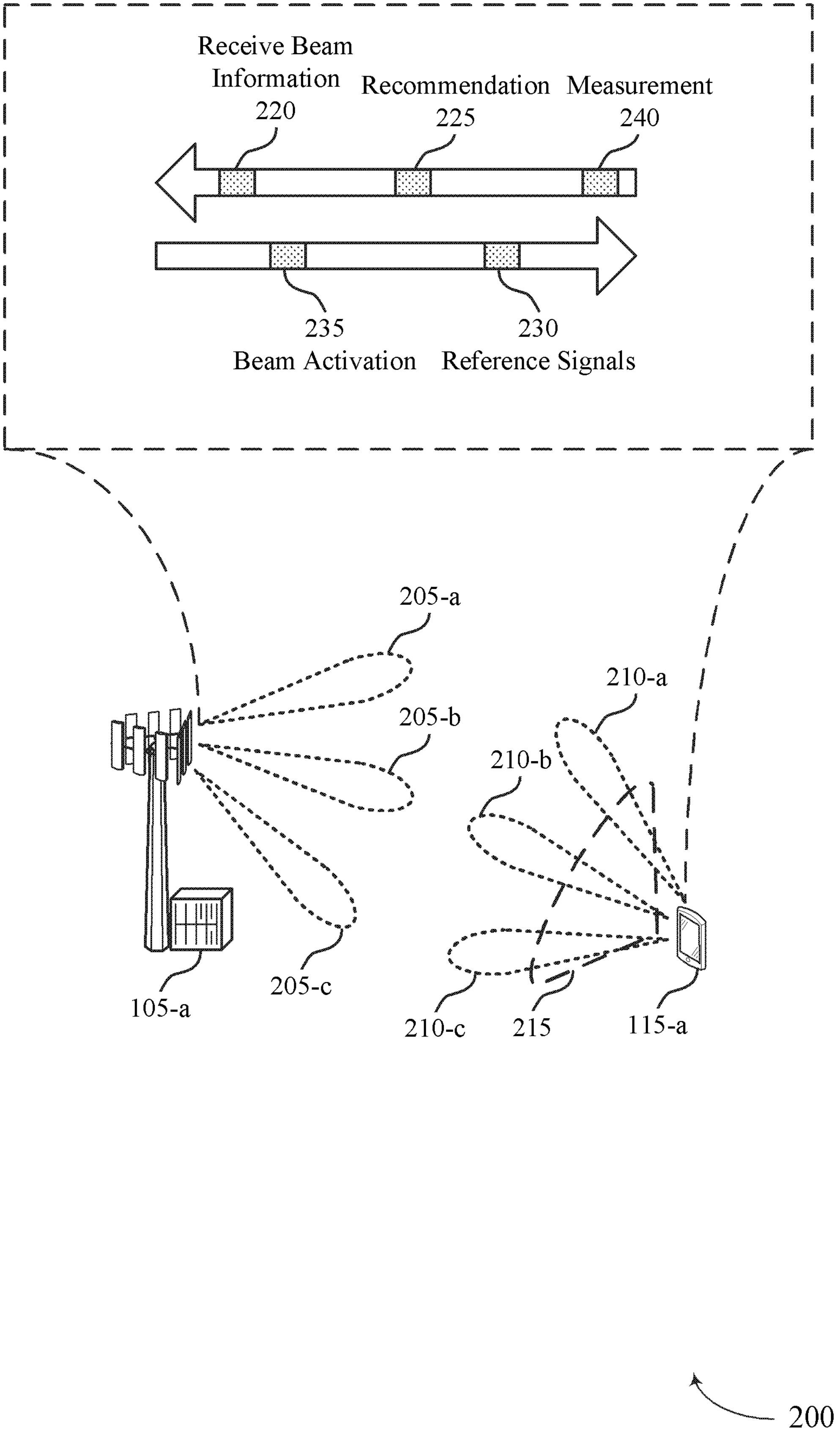
FIG. 2 illustrates an example of a wireless communications system that supports beam pair prediction and indication in accordance with one or more aspects of the present disclosure.

FIG. 2 illustrates an example of a wireless communications system 200 that supports beam pair prediction and indication in accordance with one or more aspects of the present disclosure. The wireless communications system 200 may include a UE 115-*a* and a network entity 105-*a*, which may be respective examples of a UE 115 and a network entity 105 as described with reference to FIG. 1. The UE 115-*a* and the network entity 105-*a* may communicate using beamformed signaling. For example, the network entity 105-*a* may transmit to the UE 115-*a* using one or more transmit beams 205, such as a transmit beam 205-*a*, a transmit beam 205-*b*, or a transmit beam 205-*c*. The UE 115-*a* may receive the signaling using one or more receive beams (e.g., one or more narrow receive beams 210 or one or more wide receive beams 215, or both).

The UE 115-*a* may transmit signaling indicating receive beam information 220 to the network entity 105-*a*. The receive beam information 220 may include relative beam pointing directions and beam widths for receive beams at the UE 115-*a*. For example, the UE 115-*a* may report beam pointing directions and beam widths for narrow receive beams 210 (e.g., narrow receive beam 210-*a*, narrow receive beam 210-*b*, and narrow receive beam 210-*c*) and for wide receive beams 215 of the UE 115-*a*. The receive beam information 220 may include hierarchical receive beam information, such as information regarding how antenna panels at the UE 115-*a* are configured and how receive beams of different widths are supported at each antenna panel. In some examples, the UE 115-*a* may report receive beam information semi-persistently, such as via RRC signaling. For example, the UE 115-*a* may transmit, to the network entity 105-*a*, an RRC message including the receive beam information 220.

In some examples, the receive beam information 220 may include orientation information for the UE 115-*a* or the receive beams of the UE 115-*a*, or both. For example, the UE 115-*a* may report real-time absolute beam pointing directions and beam widths for the receive beams of the UE 115-*a*. In some examples, the real-time absolute beam pointing directions may be indicated in accordance with a local coordinate system (LCS) or global coordinate system (GCS) format. For example, the UE 115-*a* may indicate a beam width and a real-time beam pointing direction of the narrow receive beam 210-*b*, among other receive beams at the UE 115-*a*. In some examples, the UE 115-*a* may dynamically indicate the receive beam information 220. For example, the UE 115-*a* may transmit the receive beam information 220 via a MAC control element (CE) or uplink control information, or both. In some cases, the UE 115-*a* may update the absolute pointing directions and beam widths of the receive beams at the UE 115-*a* (e.g., regularly or dynamically).

In some examples, the UE 115-*a* may indicate the receive beam information 220 semi-persistently (e.g., via RRC signaling) and transmit updates of UE orientation dynamically. For example, the UE 115-*a* may report receive beam pointing directions via RRC signaling, and the UE 115-*a* may dynamically update real-time orientation information via a MAC CE or uplink control information. In some examples, the UE 115-*a* may report changes to an orientation of the UE 115-*a*, which may be used by the network entity 105-*a* to determine new beam pointing directions of the receive beams at the UE 115-*a*. The UE 115-*a* provide an initial report of receive beam information, considering UE orientation, and the UE 115-*a* may provide updates based on orientation updates.

In some examples, the UE 115-*a* may transmit signaling indicating a recommendation 225 for a measurement receive beam set and a prediction receive beam set. For example, among the reported receive beams of the UE 115-*a*, the UE 115-*a* may further recommend which beams the UE 115-*a* should measure and which beams should rely on network entity-side predictions. In some examples, the UE 115-*a* may recommend that the UE 115-*a* measures (e.g., and provides measurements for) wide receive beams 215, and the UE 115-*a* may recommend that the network entity 105-*a* performs predictions for the narrow receive beams 210. The UE 115-*a* may transmit the recommendation semi-persistently or dynamically, or both. For example, the UE 115-*a* may transmit an RRC message or a MAC CE to indicate the recommendation 225 semi-persistently, or the UE 115-*a* may transmit a MAC CE or uplink control information message to indicate the recommendation 225 dynamically.

In some cases, the network entity 105-*a* may alter the UE recommended measurement beam set and prediction beam set. For example, the UE 115-*a* may recommend to perform measurements for a first set of receive beams, and the network entity 105-*a* may transmit a message indicating a second set of receive beams in response. The second set of receive beams may be different from the first set of receive beams, and the UE 115-*a* may perform measurements on (e.g., and report measurements for) receive beams in the second set of receive beams. In some examples, the network entity 105-*a* may transmit the message to alter the recommended measured receive beams and recommended predicted receive beams via an RRC message, a MAC CE, or a downlink control information message. For example, the network entity 105-*a* may indicate the update through configured receive beam identifier associated with a CSI report.

In some examples, the wireless communications system 200 may support a predefined hierarchical beam width reporting framework. For example, the UE 115-*a* may report a first quantity of wide receive beams, including detailed beam pointing direction information, orientation information, and beam width information. For each reported wide receive beam, the UE 115-*a* may report detailed beam pointing direction and beam width information for a second quantity of narrow receive beams. The narrow receive beams may be super-positioned with the associated wide receive beam but have a narrower beam width and higher beamforming gains.

For example, the narrow receive beam 210-*a*, the narrow receive beam 210-*b*, and the narrow receive beam 210-*c* may be super-positioned with the wide receive beam 215. The UE 115-*a* may report detailed beam pointing information for the wide receive beam 215, and the UE 115-*a* may indicate that the narrow receive beams 210 are super-positioned with the wide receive beam 215 and provide detailed beam pointing information and beam width information for the super-positioned narrow receive beams 210.

In an example, the UE 115-*a* may have three antenna panels. There may be a first panel on a left side of the device, a second panel on a right side of the device, and a third panel on a top of the device. Each panel may provide three wide receive beams, covering wide angles but with low beamforming gains. Within each of the three wide receive beams, there may be two mid-level narrow receive beams super-positioned with the corresponding wide receive beam, providing increased beamforming gains. Within each of the mid-level narrow receive beams, there may be three refined-level narrow receive beams that super-positioned with the corresponding mid-level narrow receive beam, providing a highest beamforming gain. Therefore, each panel may provide 18 total receive beams, and the UE 115-*a* may have 54 total receive beams.

In a first example, the UE 115-*a* may report (e.g., via RRC signaling) the receive beam information 220 including the beam pointing direction and beam width information for all 54 receive beams. The UE 115-*a* may transmit the recommendation 225, recommending for the UE 115-*a* to measure and report L1 RSRP or L1 SINR, or both, for the wide receive beams. The recommendation 225 may further recommend that the UE 115-*a* is to rely on network entity-side beam pair prediction for receiving a downlink shared channel message via the remaining narrower beams (e.g., the mid-level narrow receive beams or the refined-level narrow receive beams).

In a second example, the UE 115-*a* may report (e.g., via RRC signaling) the receive beam information 220 including the beam pointing direction and beam width information for all 54 receive beams. At a first time instance, the UE 115-*a* may further report (e.g., via a MAC CE) that the UE 115-*a* recommends to measure and report RSRP and SINR measurements for the 9 wide receive beams, while receiving a downlink shared channel message via the remaining receive beams would rely on network entity-aided beam pair prediction. At a second time instance (e.g., after the first time instance), the UE 115-*a* may transmit a second recommendation (e.g., via a MAC CE). In the second recommendation, the UE 115-*a* may recommend to measure and report RSRP and SINR for both the wide receive beams and mid-level narrow receive beams, while downlink shared channel reception via the remaining receive beams (e.g., the refined-level narrow receive beams) would rely on network entity-aided beam pair prediction.

The UE 115-*a* may then perform measurements for a first set of receive beams of the UE 115-*a*. For example, either based on the recommendation 225 or a configuration signaling from the network entity 105-*a*, the UE 115-*a* may measure reference signals 230 using the first set of receive beams. For example, the UE 115-*a* may measure the reference signals 230 using wide receive beams of the UE 115-*a* to determine RSRP measurements or SINR measurements, or both, for the wide receive beams of the UE 115-*a*. The UE 115-*a* may transmit one or more measurements 240 to the network entity 105-*a* indicating the measurements for the first set of receive beams. In some examples, an SSB may be an example of the reference signals 230. Additionally, or alternatively, a CSI-RS may be an example of the reference signals 230.

The network entity 105-*a* may transmit a message to activate a TCI state associated with a receive beam or transmit-receive beam pair at the UE 115-*a*. For example, the network entity 105-*a* may transmit the message including a beam activation 235, which may activate a TCI state at the UE 115-*a* associated with a receive beam at the UE 115-*a*. The message may activate the TCI state at the UE 115-*a*, and the UE 115-*a* may use the associated receive beam to receive a scheduled downlink shared channel message. For example, the network entity 105-*a* may configure and activate a beam pair between transmit beam 205-*b* and narrow receive beam 210-*b*.

For example, the network entity 105-*a* may indicate a predicted receive beam for the UE 115-*a* to use to receive a downlink shared channel message during a future instance or window. In some examples, the network entity 105-*a* may transmit an enhanced TCI state activation MAC CE, where each activated TCI state includes a downlink reference signal for a Type D quasi co-located source and a receive beam associated with the downlink reference signal. In some examples, each activated TCI state may correspond to a predicted time window where the receive beam may be used to receive downlink shared channel signaling. In some examples, the network entity 105-*a* may indicate the predicted receive beam via a MAC CE or downlink control information. For example, the active TCI state may be indicated via a downlink grant, such as via downlink control information scheduling a downlink shared channel. The UE 115-*a* may use the indicated receive beam within indicated time window in accordance with the activated TCI state to receive signaling via the scheduled downlink shared channel.

For each indicated receive beam, the network entity 105-*a* may further indicate a confidence level. For example, the enhanced TCI state activation message may include a confidence level for each activated TCI state. In some examples, the confidence level may be based on indicating a beam pair-specific confidence level. For example, the confidence level maybe associated with a downlink reference signal and a receive beam. In some examples, the confidence level may be based on separately indicating a downlink reference signal confidence level and a receive beam-specific confidence level. When quantizing a confidence level range, the range for the downlink reference signal may be greater than a range for the receive beam. For example, the downlink reference signal may have a confidence level between 80% and 100%, and the receive beam may have a confidence level between 50% and 80%. In some examples, a confidence level may be based on a standard deviation of predicted mean RSRPs for a beam pair.

The UE 115-*a* may verify and report an actually-measured RSRP for beam pairs or receive beams with a confidence level lower than a threshold. For example, if a confidence level for a receive beam associated with an activated TCI state does not satisfy a threshold, the UE 115-*a* may perform measurements (e.g., RSRP measurements) using that receive beam and report the measurements to the network entity 105-*a*. In some examples, the network entity 105-*a* may preconfigure the threshold value. For example, the network entity 105-*a* may set the threshold value to 60%, such that the UE 115-*a* may report RSRP measurements for receive beams with a confidence level below 60%.

Upon receiving a TCI state activation message, the UE 115-*a* may feedback (e.g., transmit to the network entity 105-*a*) an actually measured RSRP measurement for a receive beam or beam pair associated with the TCI state activation message if the TCI state activation message has a confidence level below the threshold. The network entity 105-*a* may use the actually-reported measurement to determine receive beams for the UE 115-*a*. For example, the network entity 105-*a* may change a scheduled receive beam for future downlink shared channel transmissions based on the reported measurement if the measurement indicates a low RSRP. Alternatively, the network entity 105-*a* may maintain that receive beam for future downlink shared channel transmissions if the reported measurement indicates a strong RSRP or SINR, or both.

Figure 3:
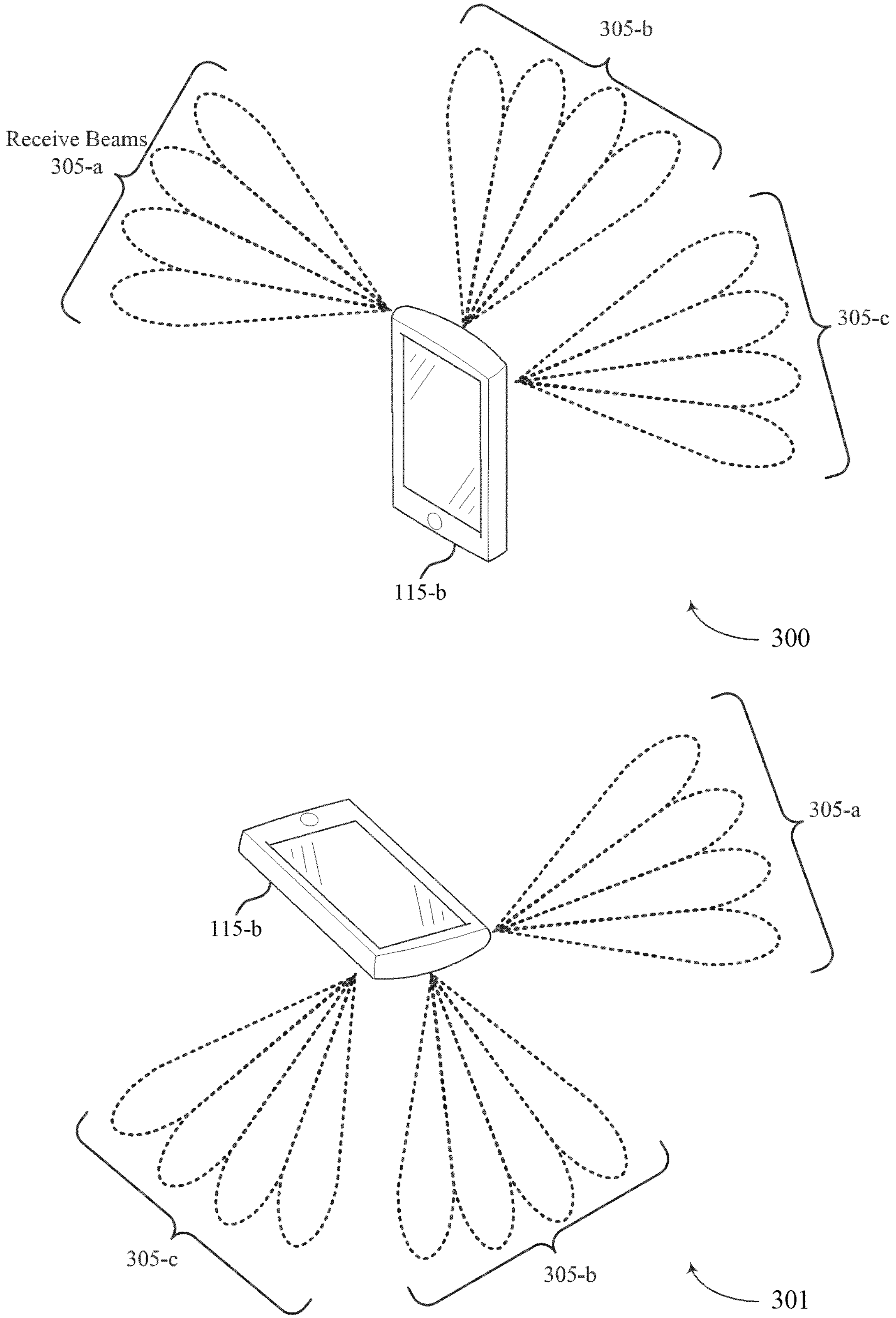
FIG. 3 illustrates an example of receive beam orientations that support beam pair prediction and indication in accordance with one or more aspects of the present disclosure.

FIG. 3 illustrates an example of receive beam orientations 300 and 301 that support beam pair prediction and indication in accordance with one or more aspects of the present disclosure. The receive beam orientations 300 and 301 may include a UE 115-*b*, which may be an example of a UE 115 as described with reference to FIGS. 1 and 2.

The UE 115-*b* may include one or more antenna panels, each of which may include multiple receive beams 305. For example, the UE 115-*b* may include three antenna panels, with a first panel on a left side of the device, a second panel on a right side of the device, and a third panel on a top of the device. In some examples, each panel may provide a first quantity of wide beams, a second quantity of mid-level narrow beams super-positioned with each wide beam, and a third quantity of refined-level narrow beams super-positioned with each mid-level narrow beam. For example, a first antenna panel may include receive beams 305-*a*, a second antenna panel may include receive beams 305-*b*, and a third antenna panel may include receive beams 305-*c*. The superposition of wide beams and narrow, or more refined, beams is described in more detail with reference to FIG. 4.

The UE 115-*b* may transmit signaling indicating receive beam information to a network entity. The receive beam information 220 may include relative beam pointing directions and beam widths for the receive beams 305 at the UE 115-*b*. For example, the UE 115-*a* may report beam pointing directions and beam widths for the receive beams 305-*a*, the receive beams 305-*b*, and the receive beams 305-*c*. In some examples, the receive beam information 220 may include hierarchical receive beam information, such as information regarding how antenna panels at the UE 115-*a* are configured and how receive beams of different widths are supported at each antenna panel.

In some examples, the receive beam information may include orientation information for the UE 115-*b* or the receive beams 305 of the UE 115-*b*, or both. For example, the UE 115-*b* may report real-time absolute beam pointing directions and beam widths for the receive beams 305 of the UE 115-*b*. In some examples, the real-time absolute beam pointing directions may be indicated in accordance with a LCS or GCS format.

For example, the UE 115-*b* may indicate a beam width and a real-time beam pointing direction of the receive beams 305-*a*, the receive beams 305-*b*, and the receive beams 305-*c*, among other receive beams at the UE 115-*b* in the receive beam orientation 300.

In some examples, an orientation of the UE 115-*b* may change or be updated. For example, the UE 115-*b* may move within the wireless network. Additionally, or alternatively, the UE 115-*b* may be rotated, such as by a user handling the UE 115-*b*. These rotations and changes may affect an orientation of the receive beams 305 of the UE 115-*b*.

In some examples, the UE 115-*b* may dynamically indicate receive beam information and orientation information. For example, the UE 115-*a* may dynamically transmit receive beam information (e.g., via a MAC CE or uplink control information, or both) to update the absolute pointing directions and beam widths of the receive beams at the UE 115-*b*. For example, the UE 115-*b* may transmit a first message to indicate receive beam information for the receive beam orientation 300, and the UE 115-*b* may transmit a second message to indicate receive beam information for the receive beam orientation 301. The second message may, in some cases, dynamically update real-time orientation information of the UE 115-*b* or of the receive beams 305. For example, the UE 115-*b* may indicate how beam pointing directions of the receive beams 305-*a* have changed between the receive beam orientation 300 and the receive beam orientation 301.

Figure 4:
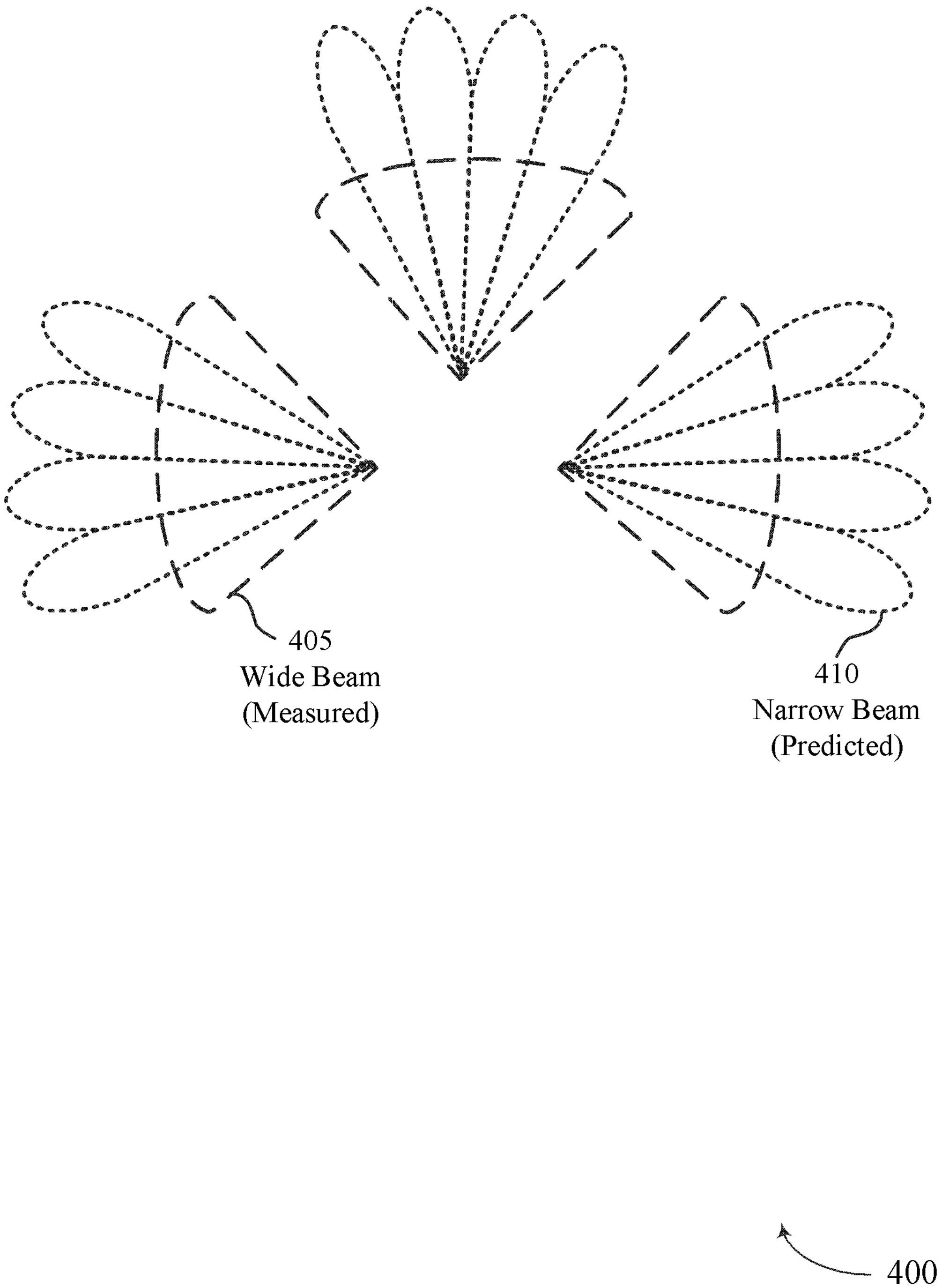
FIG. 4 illustrates an example of a receive beam super-positioning configuration that supports beam pair prediction and indication in accordance with one or more aspects of the present disclosure.

FIG. 4 illustrates an example of a receive beam super-positioning configuration 400 that supports beam pair prediction and indication in accordance with one or more aspects of the present disclosure.

A UE may have one or more antenna panels, each of which may provide one or more beams such as receive beams. For example, an antenna panel may provide a first quantity of wide receive beams 405, covering wide angles but with low beamforming gains. For example, the receive beam super-positioning configuration 400 shows an example of an antenna panel with three wide receive beams 405. Within each of the three wide beams, there may be a second quantity of mid-level narrow beams super-positioned with the corresponding wide beam, providing increased beamforming gains. For example, the receive beam super-positioning configuration 400 shows an example of four narrow receive beams 410 (e.g., mid-level narrow beams) being super-positioned with each corresponding wide receive beam 405. In some examples, there may be more refined beams corresponding to each narrow receive beam 410, such as refined-level narrow beams. In these examples, one or more refined-level beams may be super-positioned with each mid-level narrow beam, providing additional beamforming gain. The receive beam super-positioning configuration 400 is exemplary, and other configurations of antenna panels or receive beams may support or implement the techniques described herein.

A UE may implement techniques to report a recommendation for which receive beams are to be measured by the UE and which receive beams are to rely on network-assisted predictions. For example, the UE may transmit a message recommending for the UE to provide measurements for a first set of receive beams and recommending for the network entity to schedule downlink shared channels for a second set of receive beams based on network-side predictions.

In a first example, the UE may report receive beam information, including the beam pointing direction and beam width information, for a set of receive beams at the UE. The UE may transmit a signal (e.g., with the receive beam information or separately) indicating a recommendation for the UE to report measurements for the wide receive beams 405. The recommendation may further recommend that the UE is to rely on network-side beam pair prediction for receiving a downlink shared channel message via the narrow beams 410.

In a second example, the UE may report the receive beam information, including the beam pointing direction and beam width information for all receive beams of the UE. At a first time instance, the UE may further recommend that the UE measures and reports measurements for the wide receive beams 405, while downlink shared channel scheduling using a narrow receive beam 410 would rely on network-aided beam pair prediction. At a second time instance (e.g., after the first time instance), the UE may transmit a second recommendation. In the second recommendation, the UE may recommend to measure and report RSRP and SINR for both the wide receive beams 405 and narrow receive beams 410, while downlink shared channel reception via the remaining receive beams (e.g., refined-level narrow beams) would rely on network entity-aided beam pair prediction.

Figure 5:
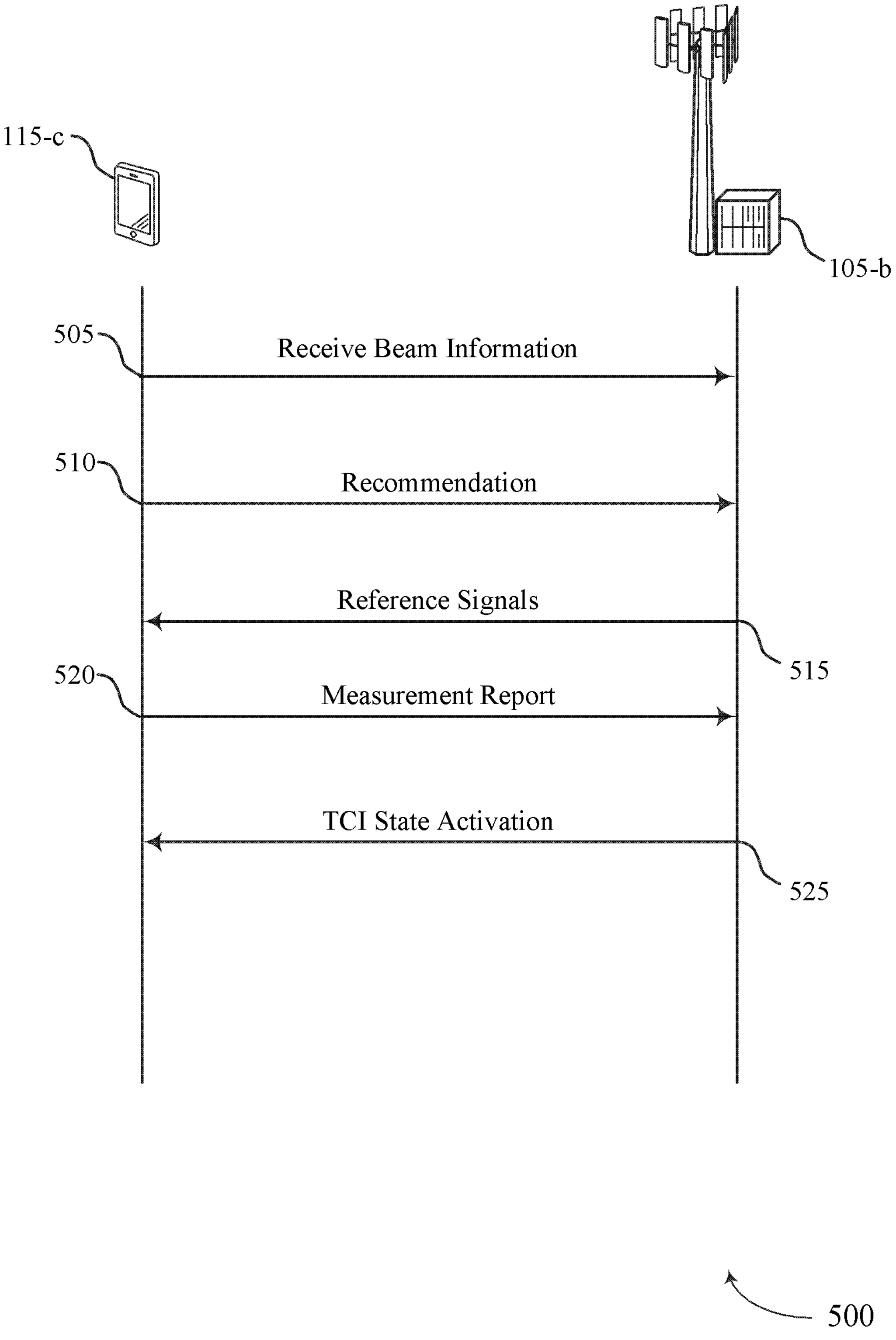
FIG. 5 illustrates an example of a process flow that supports beam pair prediction and indication in accordance with one or more aspects of the present disclosure.

FIG. 5 illustrates an example of a process flow 500 that supports beam pair prediction and indication in accordance with one or more aspects of the present disclosure. The process flow 500 may be implemented by a UE 115-*c* or a network entity 105-*b*, or both, which may be respective examples of a UE 115 and a network entity 105 as described with reference to FIGS. 1 and 2. In some examples, some procedures or signaling of the process flow 500 may occur in a different order than shown. Additionally, or alternatively, some procedures or signaling shown may not occur, or some procedures or signaling not shown may occur, or both.

At 505, the UE 115-*c* may transmit receive beam information to the network entity 105-*b*. For example, the UE 115-*c* may transmit control signaling indicating parameters for a set of receive beams at the UE 115-*c*. The parameters may be based on orientation information of the UE-c and a hierarchical beam width configuration of the set of receive beams. For example, the UE 115-*c* may transmit the control signaling indicating absolute beam pointing directions and beam widths of the receive beams at the UE 115-*c*. In some examples, the UE 115-*c* may explicitly report real-time absolute beam pointing directions and beam widths (e.g., dynamically via uplink control information or a MAC CE). Additionally, or alternatively, the UE 115-*c* may report receive beam pointing directions semi-statically (e.g., via RRC signaling), and the UE 115-*c* may further report real-time orientation information dynamically (e.g., via uplink control information or a MAC CE). For example, the UE 115-*c* may indicate changes to an orientation of the UE 115-*c* or changes to beam pointing directions of the receive beams of the UE 115-*c*.

At 510, the UE 115-*c* may transmit a message including a recommendation for the UE to report measurements for an initial subset of receive beams and for a network entity to predict measurements for a second subset of receive beams. For example, the UE 115-*c* may recommend for the UE 115-*c* to report measurements for a first subset of receive beams and recommend for scheduling using the second subset of receive beams to rely on network-side predictions. In some examples, the network entity 105-*b* may alter the UE's recommendation. For example, the network entity 105-*b* may configure the UE 115-*c* to provide measurements for a different subset of receive beams or for the network entity 105-*b* to perform predictions when scheduling transmissions using a different subset of receive beams.

At 515, the UE 115-*c* may receive and measure one or more reference signals using a first subset of receive beams of a first set of beam pairs based on the parameters. For example, the UE 115-*c* may perform RSRP measurements or SINR measurements, or both, using the first subset of receive beams. In some examples, the first subset of receive beams may correspond to the recommended subset of measurement receive beams. At 520, the UE 115-*c* may transmit one or more measurement reports for the first subset of receive beams based on measuring the one or more reference signals.

At 525, the network entity 105-*b* may transmit a message activating a TCI state at the UE 115-*c*. In some examples, the message activating the TCI state may be an example of an enhanced TCI activation message. For example, the message may activate a TCI state for a receive beam of a beam pair for the UE 115-*c* to receive a downlink shared channel message. In some examples, the message may indicate a downlink reference signal for a Type D QCL association and a receive beam associated with the downlink reference signal. In some examples, the message may indicate a predicted time window where the UE 115-*c* may use the receive beam to receive the downlink shared channel message. For example, the message may indicate a set of slots where the TCI state is activated, which may include scheduled resources, or predicted scheduled resources, for the downlink shared channel message.

In some examples, the receive beam to receive the downlink shared channel message may be a receive beam relying on network-side predictions. For example, the network entity 105-*b* may predict that the receive beam is a strong beam to receive the downlink shared channel message, or that the receive beam will have strong RSRP characteristics or SINR characteristics when the downlink shared channel message is transmitted. In some cases, the receive beam may not have been measured by the UE 115-*c* when the TCI state is activated.

The network entity 105-*b* may indicate a confidence level for the receive beam or the beam pair with the message activating the TCI state. If the confidence level is below, or does not satisfy, a threshold, the UE 115-*c* may perform a measurement using the receive beam and transmit a measurement report for the receive beam to the network entity 105-*b*. In some examples, the threshold for the measurement may be indicated to the UE 115-*c* via RRC signaling, a MAC CE, or downlink control information. In some examples, the threshold may be preconfigured, such as by being preconfigured for a wireless communications system including the UE 115-*c* and the network entity 105-*b*.

By implementing these techniques, the UE 115-*c* may provide information which improves predicted beam management. For example, with the UE 115-*c* providing orientation information for the receive beams at the UE 115-*c*, the network entity 105-*b* may select an efficient receive beam that is pointing toward a transmit beam of the network entity 105-*b*. Additionally, by indicating a confidence level for a beam, the UE 115-*c* may report measurements for receive beams which do not have a high likelihood of being an efficient beam, which may improve beam reliability for downlink signaling.

Figure 6:
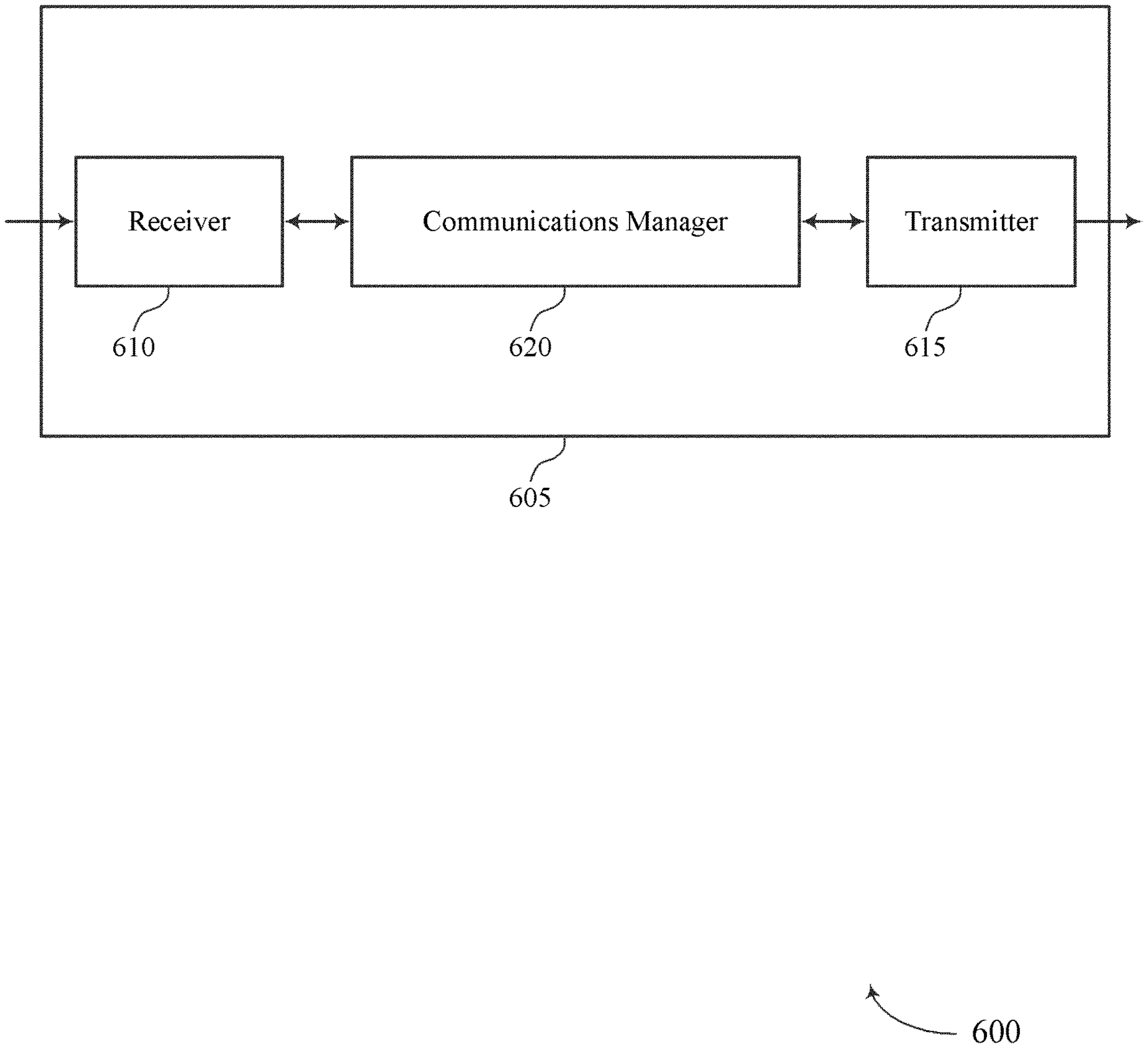
FIGS. 6 and 7 show block diagrams of devices that support beam pair prediction and indication in accordance with one or more aspects of the present disclosure.

FIG. 6 shows a block diagram 600 of a device 605 that supports beam pair prediction and indication in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam pair prediction and indication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam pair prediction and indication). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of beam pair prediction and indication as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for transmitting control signaling indicating parameters for a set of receive beams at the UE, the parameters based on an orientation of the UE and a hierarchical beam width configuration of the set of receive beams. The communications manager 620 may be configured as or otherwise support a means for measuring one or more reference signals using a first subset of receive beams of a first set of beam pairs based on the parameters. The communications manager 620 may be configured as or otherwise support a means for transmitting one or more measurement reports for the first subset of receive beams based on measuring the one or more reference signals.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced power consumption by reducing measurement reporting overhead and signaling. Additionally, by improving reliability of beam prediction, these techniques may increase beamforming accuracy.

Figure 7:
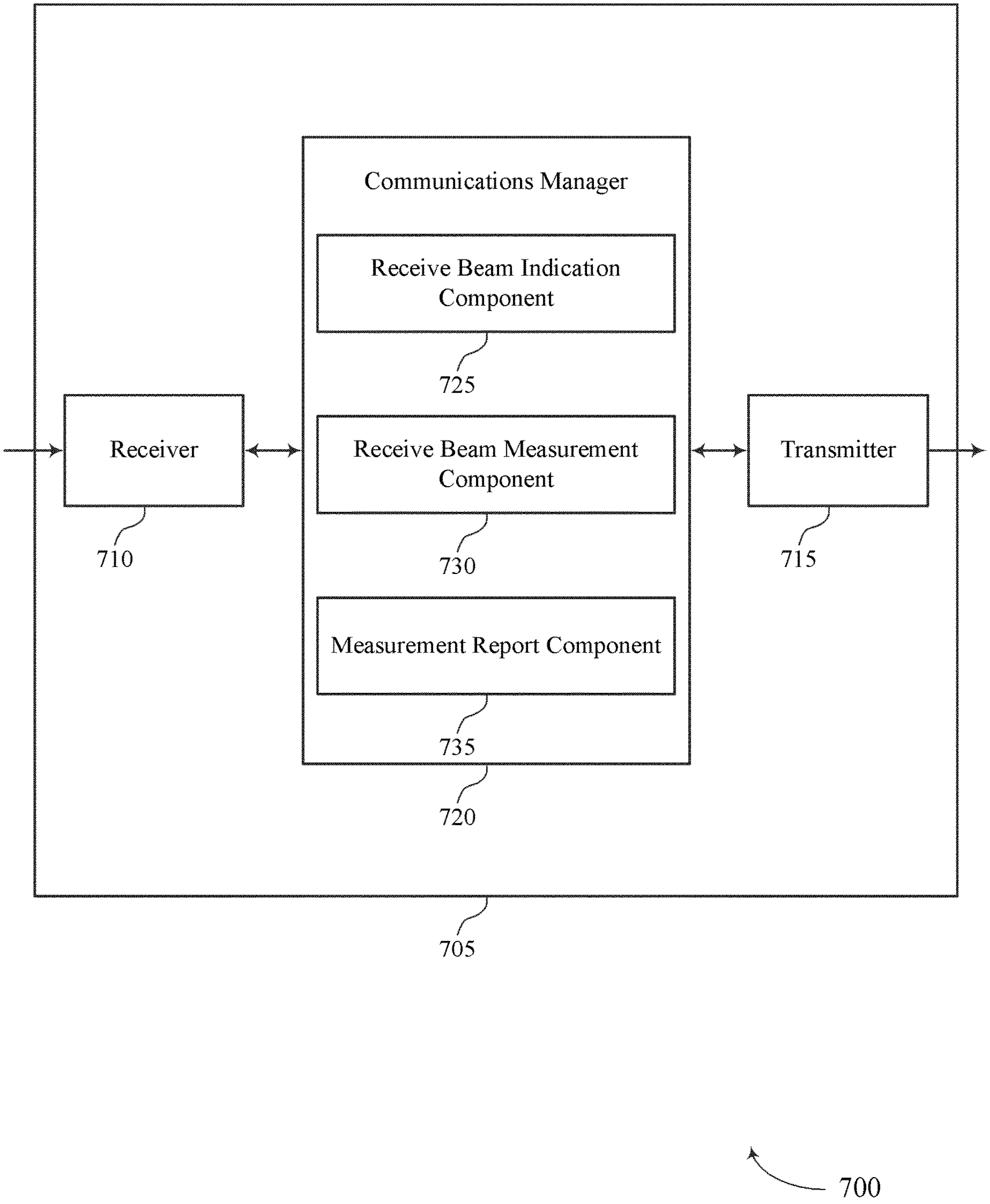

FIG. 7 shows a block diagram 700 of a device 705 that supports beam pair prediction and indication in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to beam pair prediction and indication). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to beam pair prediction and indication). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of beam pair prediction and indication as described herein. For example, the communications manager 720 may include a receive beam indication component 725, a receive beam measurement component 730, a measurement report component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The receive beam indication component 725 may be configured as or otherwise support a means for transmitting control signaling indicating parameters for a set of receive beams at the UE, the parameters based on an orientation of the UE and a hierarchical beam width configuration of the set of receive beams. The receive beam measurement component 730 may be configured as or otherwise support a means for measuring one or more reference signals using a first subset of receive beams of a first set of beam pairs based on the parameters. The measurement report component 735 may be configured as or otherwise support a means for transmitting one or more measurement reports for the first subset of receive beams based on measuring the one or more reference signals.

Figure 8:
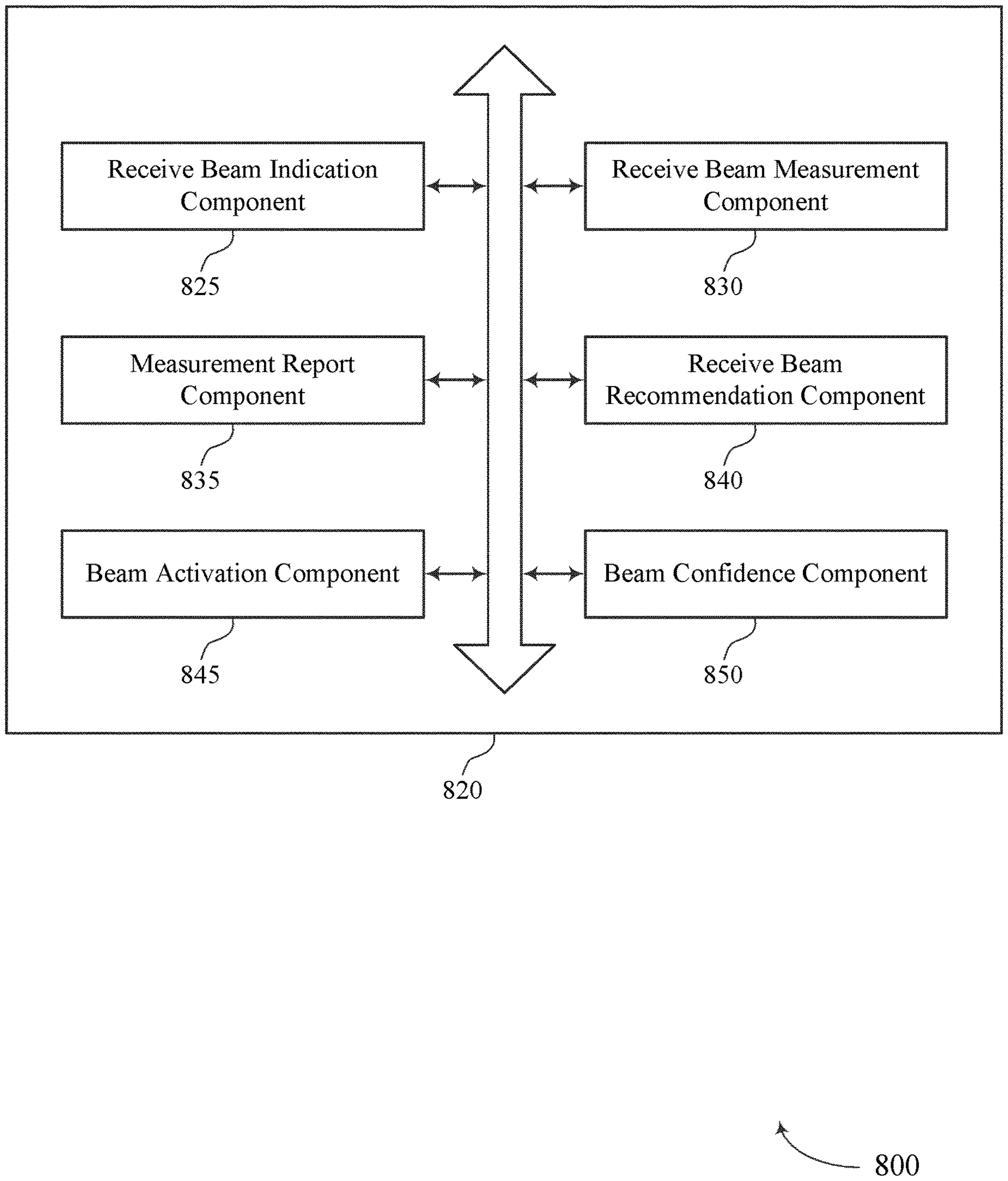
FIG. 8 shows a block diagram of a communications manager that supports beam pair prediction and indication in accordance with one or more aspects of the present disclosure.

FIG. 8 shows a block diagram 800 of a communications manager 820 that supports beam pair prediction and indication in accordance with one or more aspects of the present disclosure. The communications manager 820 may be an example of aspects of a communications manager 620, a communications manager 720, or both, as described herein. The communications manager 820, or various components thereof, may be an example of means for performing various aspects of beam pair prediction and indication as described herein. For example, the communications manager 820 may include a receive beam indication component 825, a receive beam measurement component 830, a measurement report component 835, a receive beam recommendation component 840, a beam activation component 845, a beam confidence component 850, or any combination thereof. Each of these components may communicate, directly or indirectly, with one another (e.g., via one or more buses).

The communications manager 820 may support wireless communications at a UE in accordance with examples as disclosed herein. The receive beam indication component 825 may be configured as or otherwise support a means for transmitting control signaling indicating parameters for a set of receive beams at the UE, the parameters based on an orientation of the UE and a hierarchical beam width configuration of the set of receive beams. The receive beam measurement component 830 may be configured as or otherwise support a means for measuring one or more reference signals using a first subset of receive beams of a first set of beam pairs based on the parameters. The measurement report component 835 may be configured as or otherwise support a means for transmitting one or more measurement reports for the first subset of receive beams based on measuring the one or more reference signals.

In some examples, to support transmitting the control signaling, the receive beam indication component 825 may be configured as or otherwise support a means for transmitting the control signaling indicating beam directions for the set of receive beams and beam widths for the set of receive beams based on the orientation of the UE and the hierarchical beam width configuration.

In some examples, the receive beam indication component 825 may be configured as or otherwise support a means for transmitting a control message indicating a change to the orientation of the UE via uplink control information, a MAC CE, or both.

In some examples, the receive beam recommendation component 840 may be configured as or otherwise support a means for transmitting a message including a recommendation for the UE to report measurements for an initial subset of receive beams and for a network entity to predict measurements for a second subset of receive beams.

In some examples, the receive beam recommendation component 840 may be configured as or otherwise support a means for receiving, from the network entity, a control message indicating for the UE to report measurements for the first subset of receive beams, where the one or more reference signals are measured for the first subset of receive beams instead of the initial subset of receive beams based on the control message. In some examples, the first subset of receive beams is the initial subset of receive beams.

In some examples, to support transmitting the message, the receive beam recommendation component 840 may be configured as or otherwise support a means for transmitting the message via an uplink control information message, a MAC CE, or an RRC message.

In some examples, the beam activation component 845 may be configured as or otherwise support a means for receiving, based on the one or more measurement reports, a message activating a TCI state for a receive beam of a beam pair to receive a downlink shared channel message.

In some examples, to support receiving the message indicating the TCI state, the beam confidence component 850 may be configured as or otherwise support a means for receiving the message indicating a confidence level for the receive beam.

In some examples, the beam confidence component 850 may be configured as or otherwise support a means for measuring a second one or more reference signals using the receive beam based on the confidence level for the receive beam failing to satisfy a threshold. In some examples, the beam confidence component 850 may be configured as or otherwise support a means for transmitting a measurement report for the receive beam based on measuring the second one or more reference signals.

In some examples, the beam confidence component 850 may be configured as or otherwise support a means for receiving control signaling indicating a downlink reference signal confidence level.

In some examples, the confidence level for the receive beam is based on a standard deviation of a predicted mean reference signal received power for the receive beam.

In some examples, the message includes a time window for communicating using the receive beam of the beam pair.

In some examples, the parameters include at least a first set of parameters for a set of wide beams and at least a second set of parameters for a set of narrow beams. In some examples, one or more narrow beams are super-positioned with a wide beam.

In some examples, the orientation of the UE is indicated based on a local coordinate system format or a global coordinate system format, or both.

Figure 9:
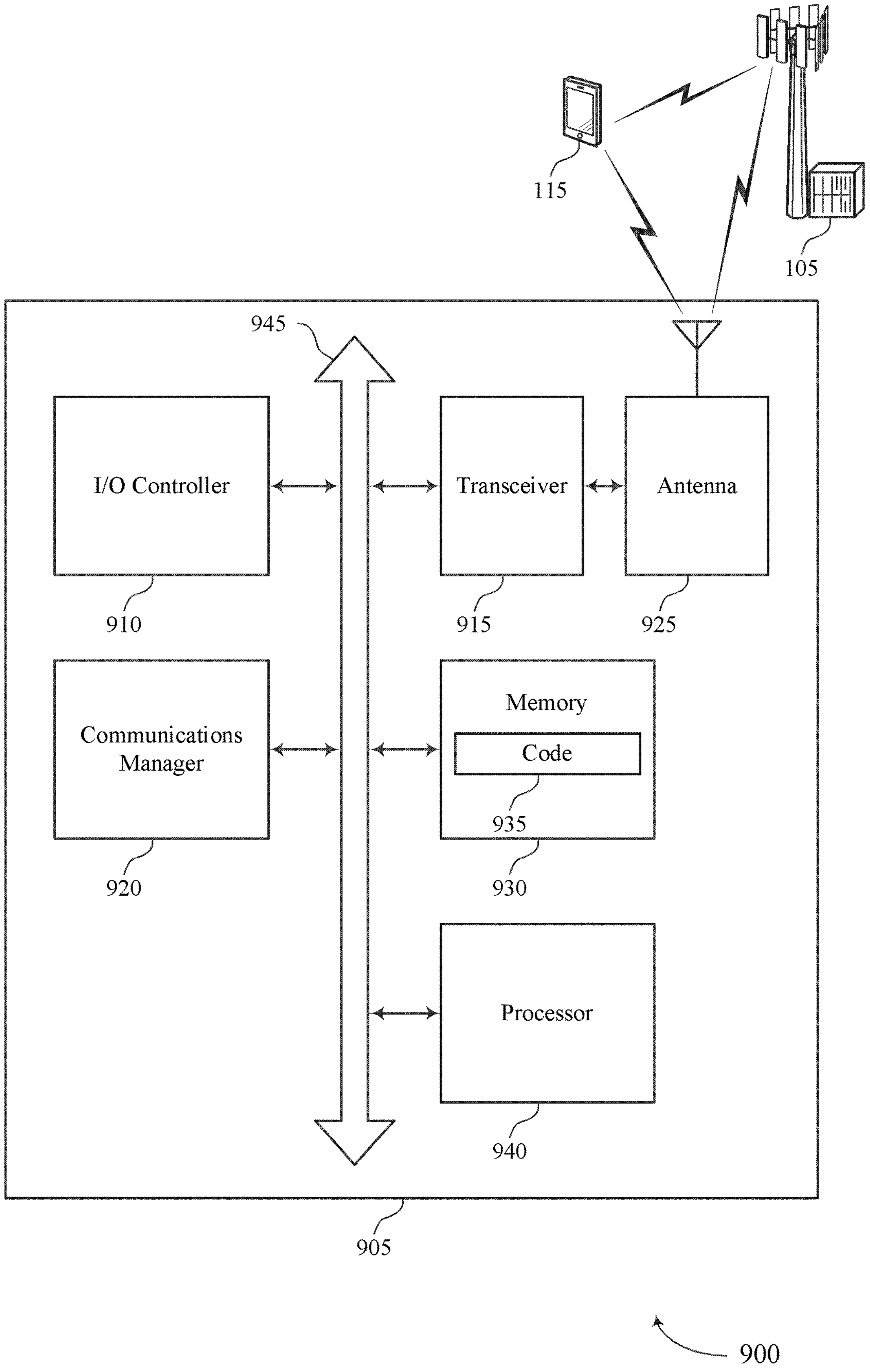
FIG. 9 shows a diagram of a system including a device that supports beam pair prediction and indication in accordance with one or more aspects of the present disclosure.

FIG. 9 shows a diagram of a system 900 including a device 905 that supports beam pair prediction and indication in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting beam pair prediction and indication). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for transmitting control signaling indicating parameters for a set of receive beams at the UE, the parameters based on an orientation of the UE and a hierarchical beam width configuration of the set of receive beams. The communications manager 920 may be configured as or otherwise support a means for measuring one or more reference signals using a first subset of receive beams of a first set of beam pairs based on the parameters. The communications manager 920 may be configured as or otherwise support a means for transmitting one or more measurement reports for the first subset of receive beams based on measuring the one or more reference signals.

By including or configuring the communications manager 920 in accordance with examples as described herein, the device 905 may support techniques for reduced power consumption by reducing measurement reporting overhead and signaling. Additionally, by improving reliability of beam prediction, these techniques may increase beamforming accuracy.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of beam pair prediction and indication as described herein, or the processor 940 and the memory 930 may be otherwise configured to perform or support such operations.

Figure 10:
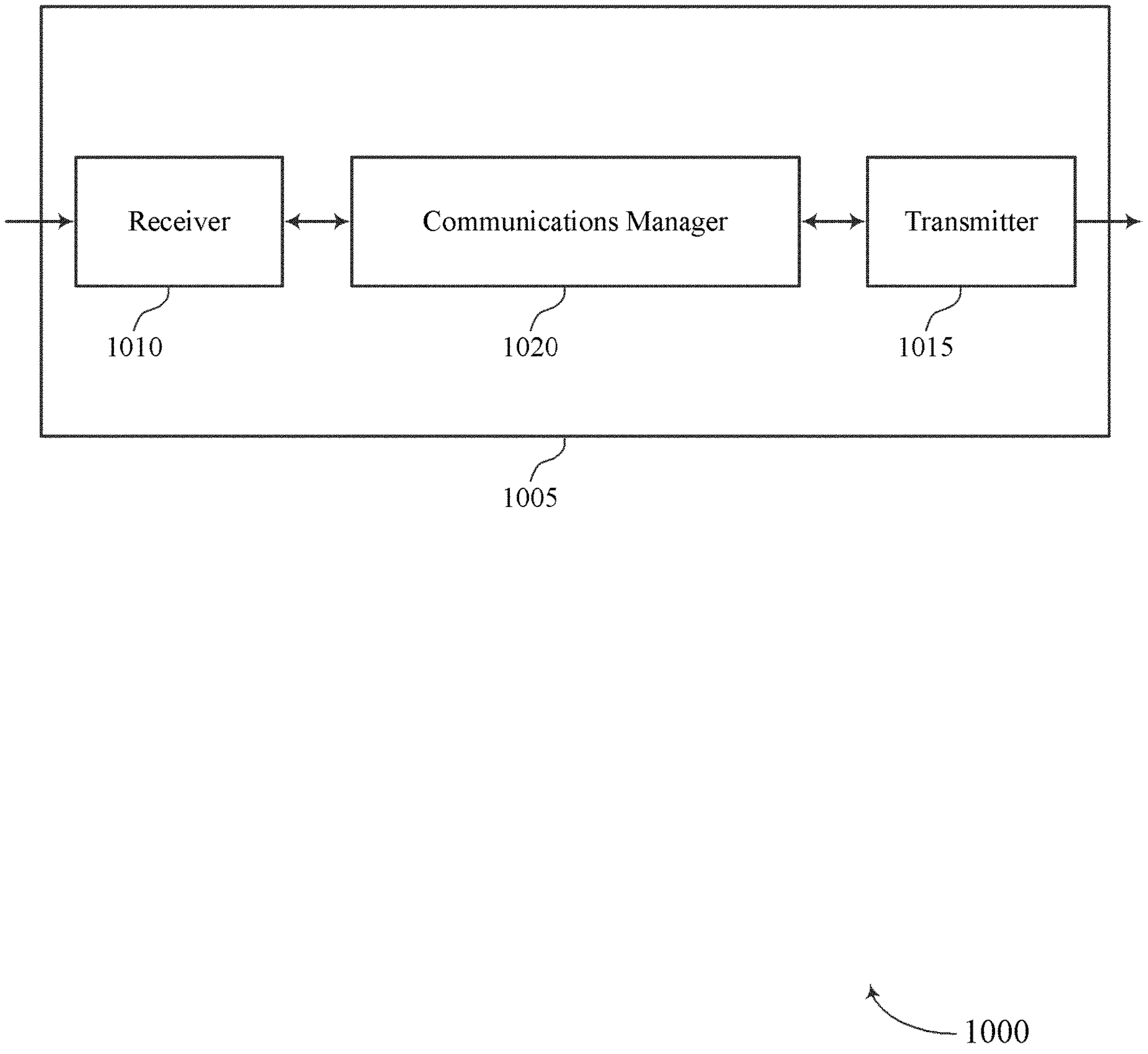
FIGS. 10 and 11 show block diagrams of devices that support beam pair prediction and indication in accordance with one or more aspects of the present disclosure.

FIG. 10 shows a block diagram 1000 of a device 1005 that supports beam pair prediction and indication in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of beam pair prediction and indication as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for receiving control signaling indicating parameters for a set of receive beams at a UE, the parameters based on an orientation of the UE and a hierarchical beam width configuration of the set of receive beams. The communications manager 1020 may be configured as or otherwise support a means for transmitting one or more reference signals using a first subset of transmit beams of a first set of beam pairs based on the parameters. The communications manager 1020 may be configured as or otherwise support a means for receiving one or more measurement reports for a first subset of receive beams based on the one or more reference signals.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced power consumption by reducing measurement reporting overhead and signaling. Additionally, by improving reliability of beam prediction, these techniques may increase beamforming accuracy.

Figure 11:
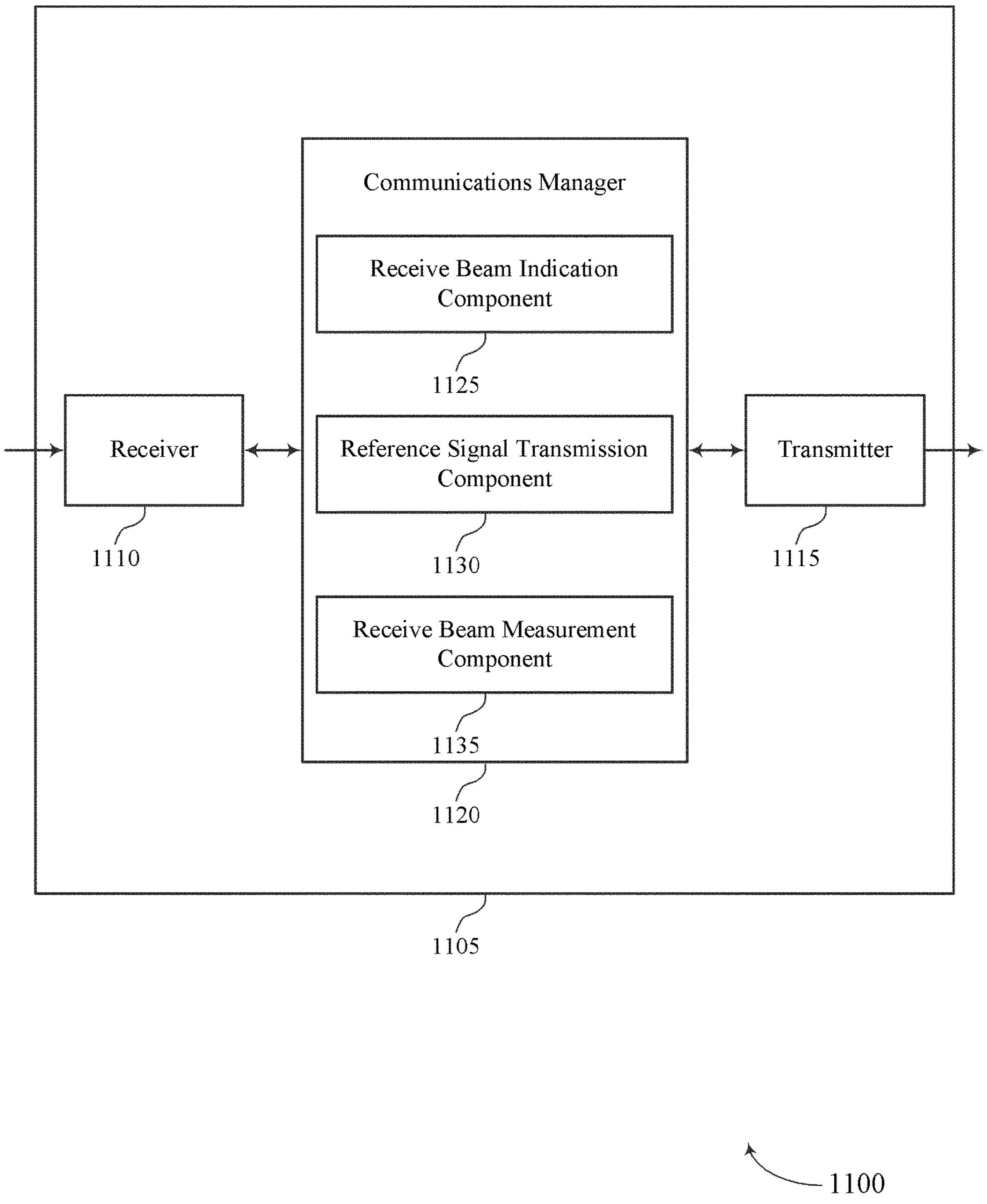

FIG. 11 shows a block diagram 1100 of a device 1105 that supports beam pair prediction and indication in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of beam pair prediction and indication as described herein. For example, the communications manager 1120 may include a receive beam indication component 1125, a reference signal transmission component 1130, a receive beam measurement component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The receive beam indication component 1125 may be configured as or otherwise support a means for receiving control signaling indicating parameters for a set of receive beams at a UE, the parameters based on an orientation of the UE and a hierarchical beam width configuration of the set of receive beams. The reference signal transmission component 1130 may be configured as or otherwise support a means for transmitting one or more reference signals using a first subset of transmit beams of a first set of beam pairs based on the parameters. The receive beam measurement component 1135 may be configured as or otherwise support a means for receiving one or more measurement reports for a first subset of receive beams based on the one or more reference signals.

Figure 12:
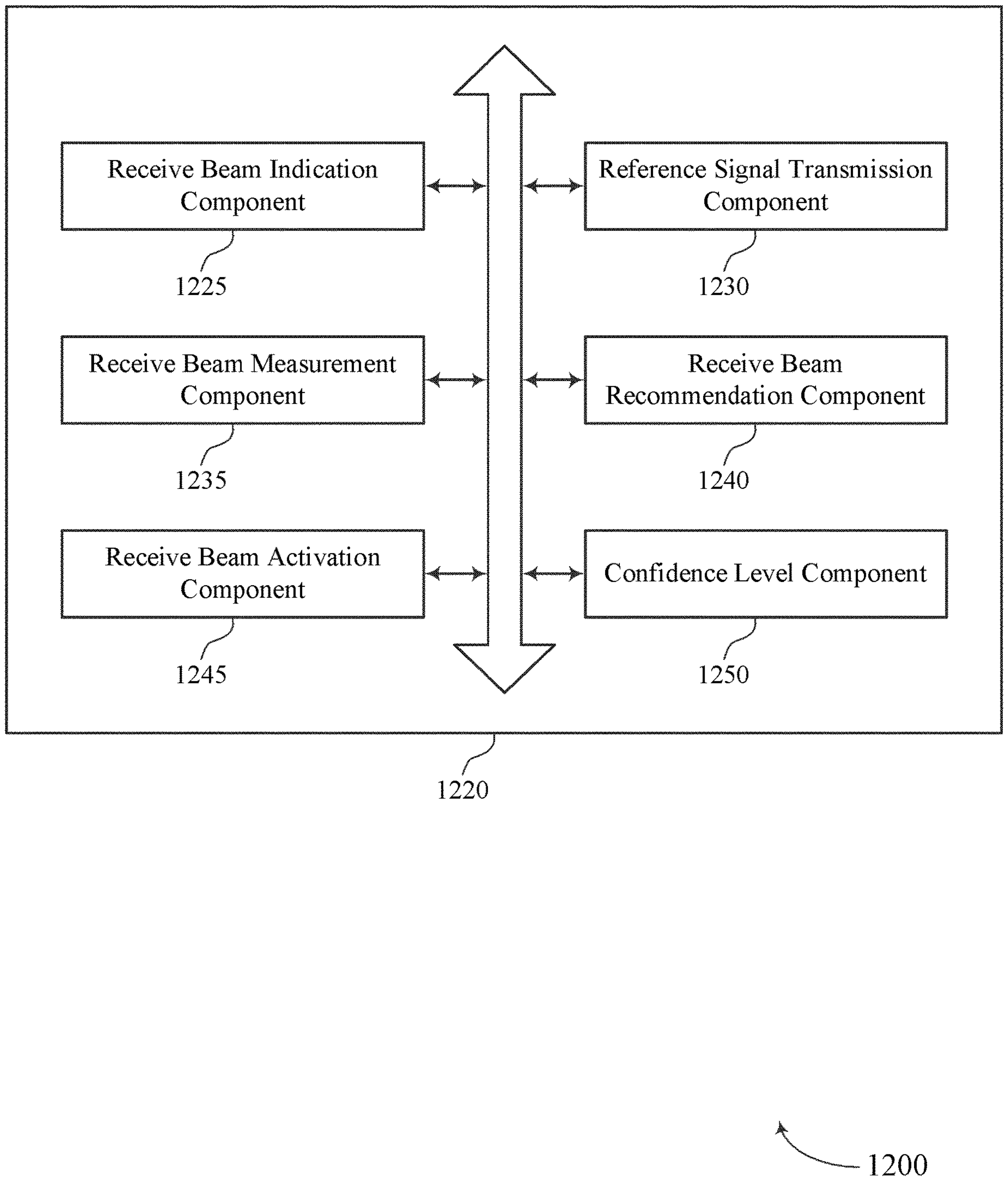
FIG. 12 shows a block diagram of a communications manager that supports beam pair prediction and indication in accordance with one or more aspects of the present disclosure.

FIG. 12 shows a block diagram 1200 of a communications manager 1220 that supports beam pair prediction and indication in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of beam pair prediction and indication as described herein. For example, the communications manager 1220 may include a receive beam indication component 1225, a reference signal transmission component 1230, a receive beam measurement component 1235, a receive beam recommendation component 1240, a receive beam activation component 1245, a confidence level component 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The receive beam indication component 1225 may be configured as or otherwise support a means for receiving control signaling indicating parameters for a set of receive beams at a UE, the parameters based on an orientation of the UE and a hierarchical beam width configuration of the set of receive beams. The reference signal transmission component 1230 may be configured as or otherwise support a means for transmitting one or more reference signals using a first subset of transmit beams of a first set of beam pairs based on the parameters. The receive beam measurement component 1235 may be configured as or otherwise support a means for receiving one or more measurement reports for a first subset of receive beams based on the one or more reference signals.

In some examples, to support receiving the control signaling, the receive beam indication component 1225 may be configured as or otherwise support a means for receiving the control signaling indicating beam directions for the set of receive beams and beam widths for the set of receive beams based on the orientation of the UE and the hierarchical beam width configuration.

In some examples, the receive beam indication component 1225 may be configured as or otherwise support a means for receiving a control message indicating a change to the orientation of the UE via uplink control information, a MAC CE, or both.

In some examples, the receive beam recommendation component 1240 may be configured as or otherwise support a means for receiving a message including a recommendation for the UE to report measurements for an initial subset of receive beams and for the network entity to predict measurements for a second subset of receive beams.

In some examples, the receive beam recommendation component 1240 may be configured as or otherwise support a means for transmitting, to the UE, a control message indicating for the UE to report measurements for the first subset of receive beams, where the one or more measurement reports are for the first subset of receive beams instead of the initial subset of receive beams based on the control message.

In some examples, the first subset of receive beams is the initial subset of receive beams.

In some examples, the receive beam activation component 1245 may be configured as or otherwise support a means for transmitting, based on the one or more measurement reports, a message activating a TCI state for a receive beam of a beam pair for the UE to receive a downlink shared channel message.

In some examples, to support transmitting the message indicating the TCI state, the confidence level component 1250 may be configured as or otherwise support a means for transmitting the message indicating a confidence level for the receive beam.

In some examples, the confidence level component 1250 may be configured as or otherwise support a means for receiving a measurement report for the receive beam based on a confidence level for the receive beam failing to satisfy a threshold.

In some examples, the confidence level component 1250 may be configured as or otherwise support a means for receiving control signaling indicating a downlink reference signal confidence level.

In some examples, the confidence level for the receive beam is based on a standard deviation of a predicted mean reference signal received power for the receive beam.

In some examples, the message includes a time window for the UE to communicate using the receive beam of the beam pair.

In some examples, the parameters include at least a first set of parameters for a set of wide beams and at least a second set of parameters for a set of narrow beams. In some examples, one or more narrow beams are super-positioned with a wide beam.

Figure 13:
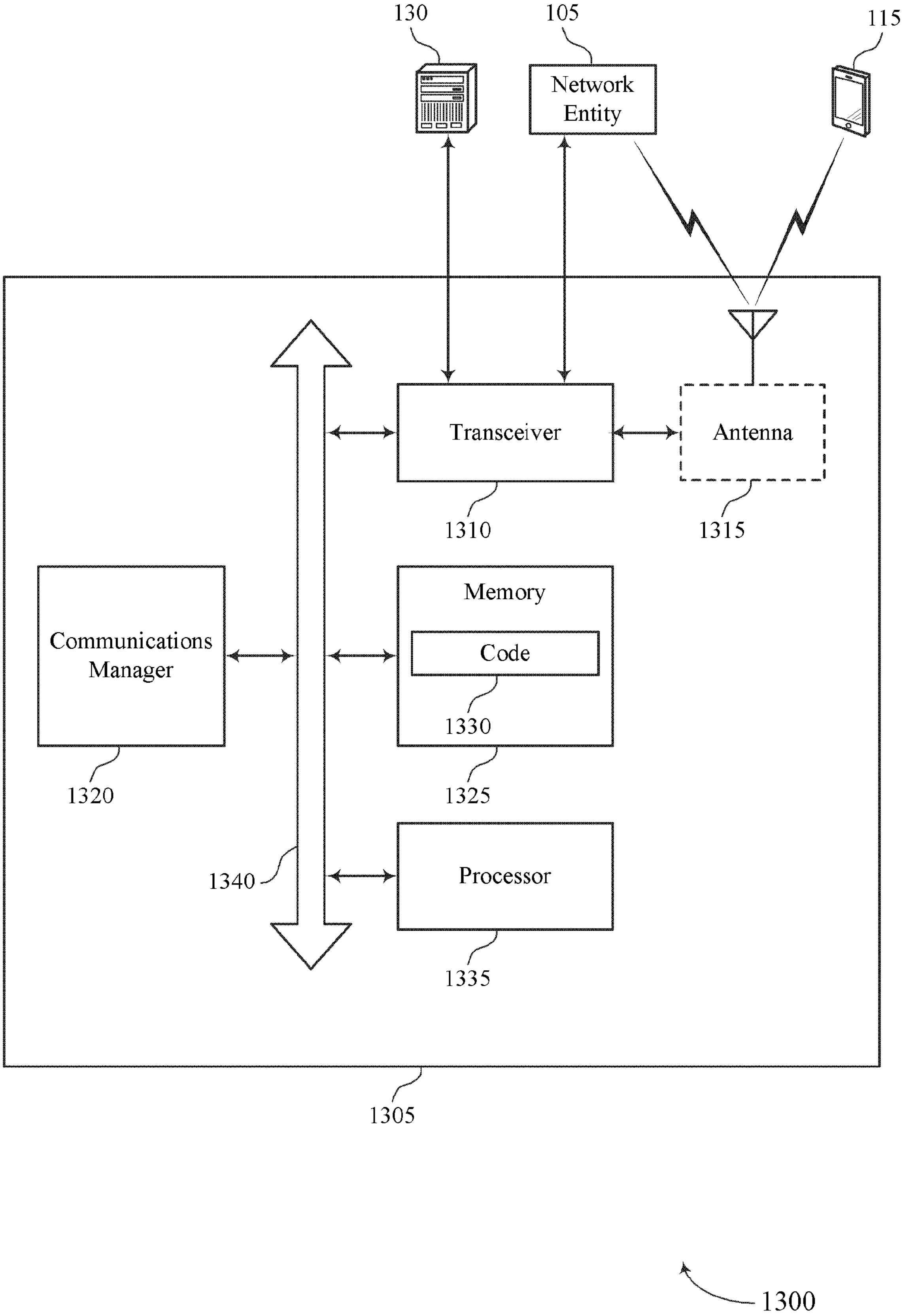
FIG. 13 shows a diagram of a system including a device that supports beam pair prediction and indication in accordance with one or more aspects of the present disclosure.

FIG. 13 shows a diagram of a system 1300 including a device 1305 that supports beam pair prediction and indication in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting beam pair prediction and indication). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for receiving control signaling indicating parameters for a set of receive beams at a UE, the parameters based on an orientation of the UE and a hierarchical beam width configuration of the set of receive beams. The communications manager 1320 may be configured as or otherwise support a means for transmitting one or more reference signals using a first subset of transmit beams of a first set of beam pairs based on the parameters. The communications manager 1320 may be configured as or otherwise support a means for receiving one or more measurement reports for a first subset of receive beams based on the one or more reference signals.

By including or configuring the communications manager 1320 in accordance with examples as described herein, the device 1305 may support techniques support techniques for reduced power consumption by reducing measurement reporting overhead and signaling. Additionally, by improving reliability of beam prediction, these techniques may increase beamforming accuracy.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of beam pair prediction and indication as described herein, or the processor 1335 and the memory 1325 may be otherwise configured to perform or support such operations.

Figure 14:
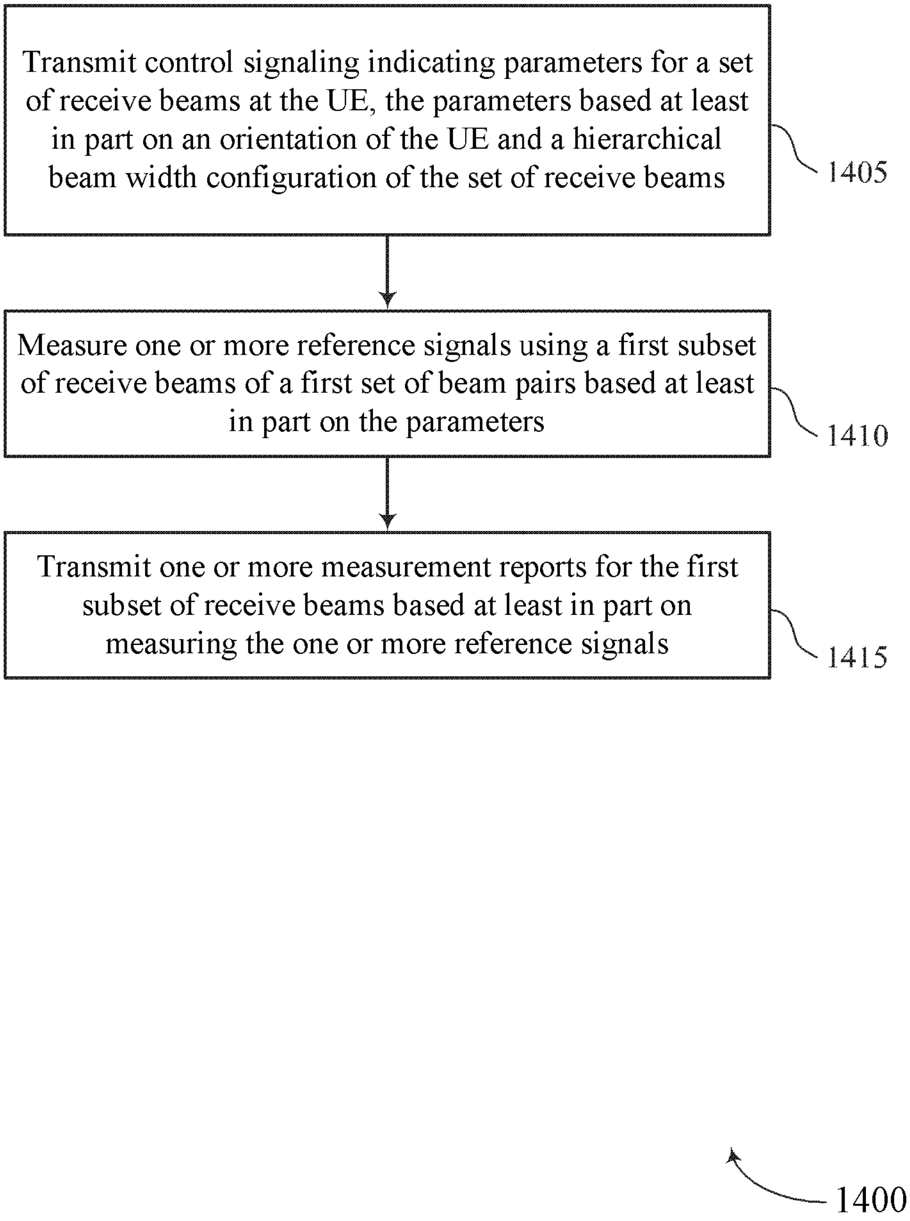
FIGS. 14 through 17 show flowcharts illustrating methods that support beam pair prediction and indication in accordance with one or more aspects of the present disclosure.

FIG. 14 shows a flowchart illustrating a method 1400 that supports beam pair prediction and indication in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include transmitting control signaling indicating parameters for a set of receive beams at the UE, the parameters based on an orientation of the UE and a hierarchical beam width configuration of the set of receive beams. The operations of 1405 may be performed in accordance with examples as disclosed herein. In some examples, aspects of the operations of 1405 may be performed by a receive beam indication component 825 as described with reference to FIG. 8.

At 1410, the method may include measuring one or more reference signals using a first subset of receive beams of a first set of beam pairs based on the parameters. The operations of 1410 may be performed in accordance with examples as disclosed herein. In some examples, aspects of the operations of 1410 may be performed by a receive beam measurement component 830 as described with reference to FIG. 8.

At 1415, the method may include transmitting one or more measurement reports for the first subset of receive beams based on measuring the one or more reference signals. The operations of 1415 may be performed in accordance with examples as disclosed herein. In some examples, aspects of the operations of 1415 may be performed by a measurement report component 835 as described with reference to FIG. 8.

Figure 15:
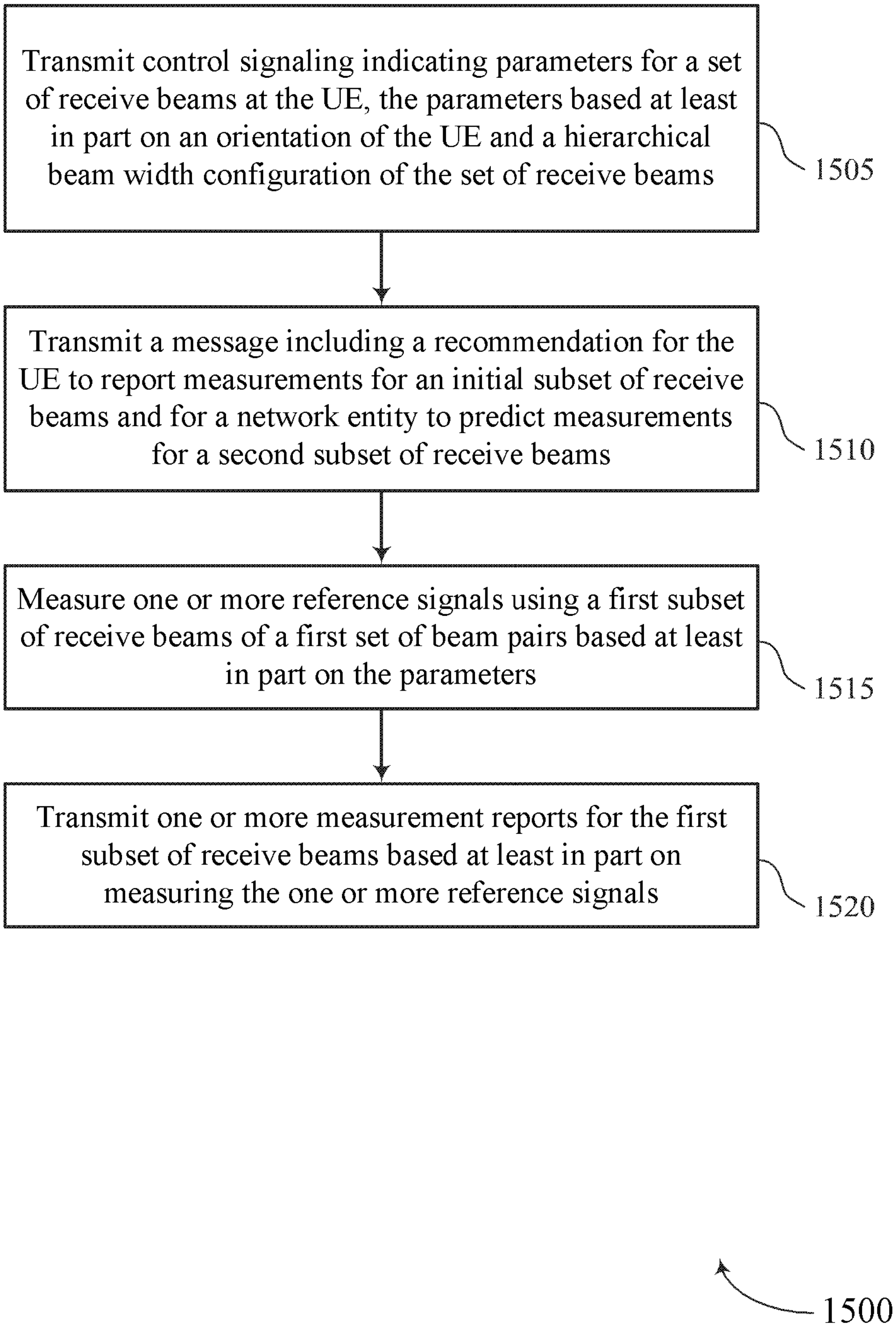

FIG. 15 shows a flowchart illustrating a method 1500 that supports beam pair prediction and indication in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting control signaling indicating parameters for a set of receive beams at the UE, the parameters based on an orientation of the UE and a hierarchical beam width configuration of the set of receive beams. The operations of 1505 may be performed in accordance with examples as disclosed herein. In some examples, aspects of the operations of 1505 may be performed by a receive beam indication component 825 as described with reference to FIG. 8.

At 1510, the method may include transmitting a message including a recommendation for the UE to report measurements for an initial subset of receive beams and for a network entity to predict measurements for a second subset of receive beams. The operations of 1510 may be performed in accordance with examples as disclosed herein. In some examples, aspects of the operations of 1510 may be performed by a receive beam recommendation component 840 as described with reference to FIG. 8.

At 1515, the method may include measuring one or more reference signals using a first subset of receive beams of a first set of beam pairs based on the parameters. The operations of 1515 may be performed in accordance with examples as disclosed herein. In some examples, aspects of the operations of 1515 may be performed by a receive beam measurement component 830 as described with reference to FIG. 8.

At 1520, the method may include transmitting one or more measurement reports for the first subset of receive beams based on measuring the one or more reference signals. The operations of 1520 may be performed in accordance with examples as disclosed herein. In some examples, aspects of the operations of 1520 may be performed by a measurement report component 835 as described with reference to FIG. 8.

Figure 16:
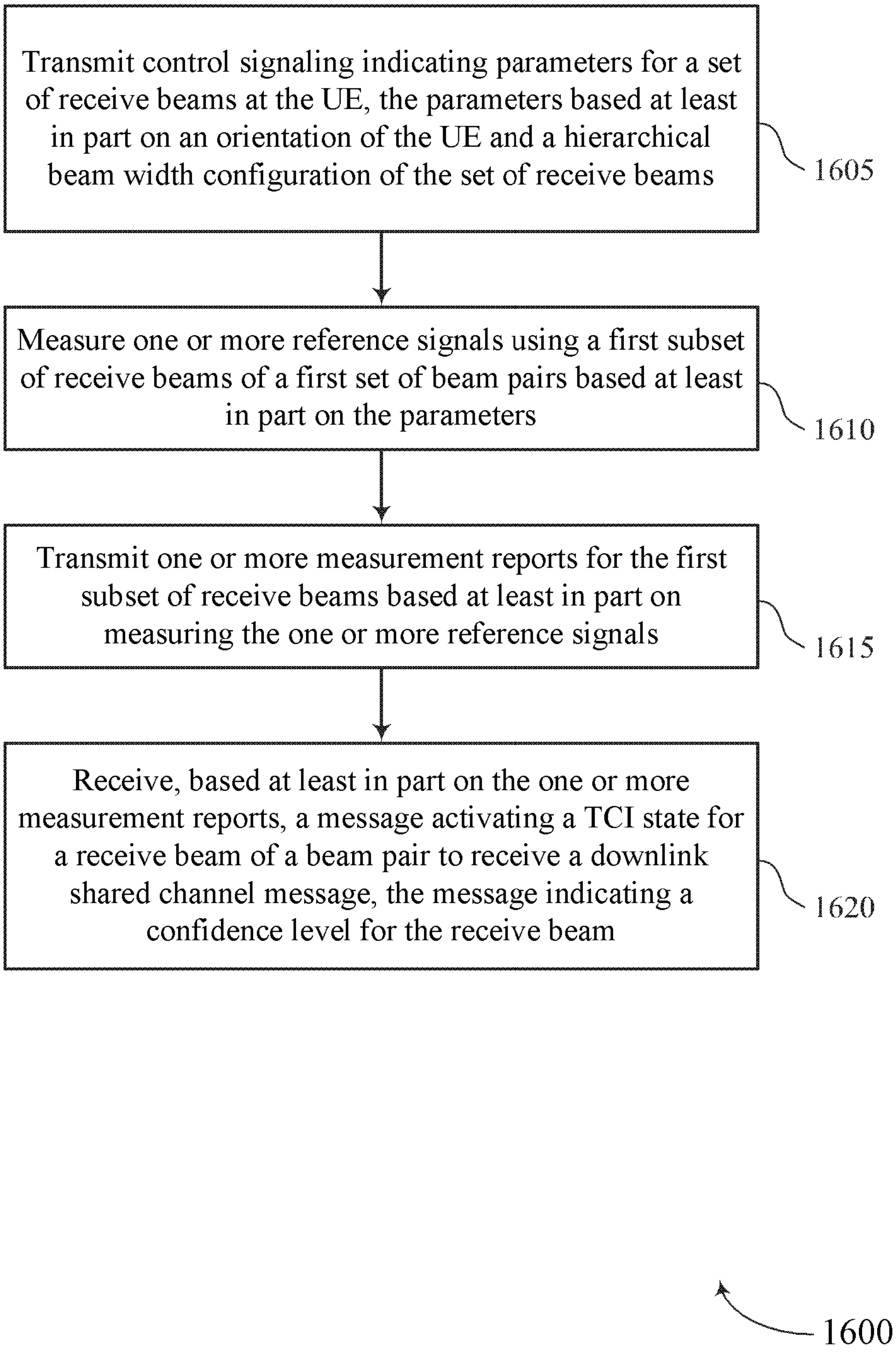

FIG. 16 shows a flowchart illustrating a method 1600 that supports beam pair prediction and indication in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include transmitting control signaling indicating parameters for a set of receive beams at the UE, the parameters based on an orientation of the UE and a hierarchical beam width configuration of the set of receive beams. The operations of 1605 may be performed in accordance with examples as disclosed herein. In some examples, aspects of the operations of 1605 may be performed by a receive beam indication component 825 as described with reference to FIG. 8.

At 1610, the method may include measuring one or more reference signals using a first subset of receive beams of a first set of beam pairs based on the parameters. The operations of 1610 may be performed in accordance with examples as disclosed herein. In some examples, aspects of the operations of 1610 may be performed by a receive beam measurement component 830 as described with reference to FIG. 8.

At 1615, the method may include transmitting one or more measurement reports for the first subset of receive beams based on measuring the one or more reference signals. The operations of 1615 may be performed in accordance with examples as disclosed herein. In some examples, aspects of the operations of 1615 may be performed by a measurement report component 835 as described with reference to FIG. 8.

At 1620, the method may include receiving, based on the one or more measurement reports, a message activating a TCI state for a receive beam of a beam pair to receive a downlink shared channel message, the message indicating a confidence level for the receive beam. The operations of 1620 may be performed in accordance with examples as disclosed herein. In some examples, aspects of the operations of 1620 may be performed by a beam activation component 845 as described with reference to FIG. 8.

Figure 17:
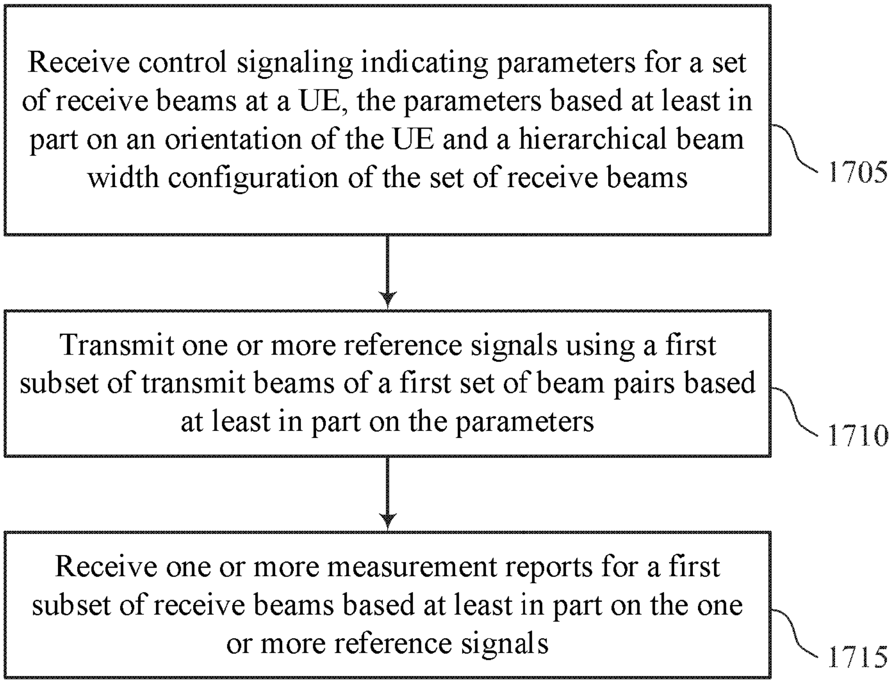

FIG. 17 shows a flowchart illustrating a method 1700 that supports beam pair prediction and indication in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include receiving control signaling indicating parameters for a set of receive beams at a UE, the parameters based on an orientation of the UE and a hierarchical beam width configuration of the set of receive beams. The operations of 1705 may be performed in accordance with examples as disclosed herein. In some examples, aspects of the operations of 1705 may be performed by a receive beam indication component 1225 as described with reference to FIG. 12.

At 1710, the method may include transmitting one or more reference signals using a first subset of transmit beams of a first set of beam pairs based on the parameters. The operations of 1710 may be performed in accordance with examples as disclosed herein. In some examples, aspects of the operations of 1710 may be performed by a reference signal transmission component 1230 as described with reference to FIG. 12.

At 1715, the method may include receiving one or more measurement reports for a first subset of receive beams based on the one or more reference signals. The operations of 1715 may be performed in accordance with examples as disclosed herein. In some examples, aspects of the operations of 1715 may be performed by a receive beam measurement component 1235 as described with reference to FIG. 12.

The following provides an overview of aspects of the present disclosure:

Aspect 1: A method for wireless communications at a UE, comprising: transmitting control signaling indicating parameters for a set of receive beams at the UE, the parameters based at least in part on an orientation of the UE and a hierarchical beam width configuration of the set of receive beams; measuring one or more reference signals using a first subset of receive beams of a first set of beam pairs based at least in part on the parameters; and transmitting one or more measurement reports for the first subset of receive beams based at least in part on measuring the one or more reference signals.

Aspect 2: The method of aspect 1, wherein transmitting the control signaling comprises: transmitting the control signaling indicating beam directions for the set of receive beams and beam widths for the set of receive beams based at least in part on the orientation of the UE and the hierarchical beam width configuration.

Aspect 3: The method of any of aspects 1 through 2, further comprising: transmitting a control message indicating a change to the orientation of the UE via uplink control information, a medium access control control element, or both.

Aspect 4: The method of any of aspects 1 through 3, further comprising: transmitting a message including a recommendation for the UE to report measurements for an initial subset of receive beams and for a network entity to predict measurements for a second subset of receive beams.

Aspect 5: The method of aspect 4, further comprising: receiving, from the network entity, a control message indicating for the UE to report measurements for the first subset of receive beams, wherein the one or more reference signals are measured for the first subset of receive beams instead of the initial subset of receive beams based at least in part on the control message.

Aspect 6: The method of any of aspects 4 through 5, wherein the first subset of receive beams is the initial subset of receive beams.

Aspect 7: The method of any of aspects 4 through 6, wherein transmitting the message comprises: transmitting the message via an uplink control information message, a medium access control element, or a radio resource control message.

Aspect 8: The method of any of aspects 1 through 7, further comprising: receiving, based at least in part on the one or more measurement reports, a message activating a transmission configuration indicator (TCI) state for a receive beam of a beam pair to receive a downlink shared channel message.

Aspect 9: The method of aspect 8, wherein receiving the message indicating the TCI state comprises: receiving the message indicating a confidence level for the receive beam.

Aspect 10: The method of aspect 9, further comprising: measuring a second one or more reference signals using the receive beam based at least in part on the confidence level for the receive beam failing to satisfy a threshold; and transmitting a measurement report for the receive beam based at least in part on measuring the second one or more reference signals.

Aspect 11: The method of any of aspects 9 through 10, further comprising: receiving control signaling indicating a downlink reference signal confidence level.

Aspect 12: The method of any of aspects 9 through 11, wherein the confidence level for the receive beam is based at least in part on a standard deviation of a predicted mean reference signal received power for the receive beam.

Aspect 13: The method of any of aspects 8 through 12, wherein the message includes a time window for communicating using the receive beam of the beam pair.

Aspect 14: The method of any of aspects 1 through 13, wherein the parameters include at least a first set of parameters for a set of wide beams and at least a second set of parameters for a set of narrow beams, one or more narrow beams are super-positioned with a wide beam.

Aspect 15: The method of any of aspects 1 through 14, wherein the orientation of the UE is indicated based at least in part on a local coordinate system format or a global coordinate system format, or both.

Aspect 16: A method for wireless communications at a network entity, comprising: receiving control signaling indicating parameters for a set of receive beams at a UE, the parameters based at least in part on an orientation of the UE and a hierarchical beam width configuration of the set of receive beams; transmitting one or more reference signals using a first subset of transmit beams of a first set of beam pairs based at least in part on the parameters; and receiving one or more measurement reports for a first subset of receive beams based at least in part on the one or more reference signals.

Aspect 17: The method of aspect 16, wherein receiving the control signaling comprises: receiving the control signaling indicating beam directions for the set of receive beams and beam widths for the set of receive beams based at least in part on the orientation of the UE and the hierarchical beam width configuration.

Aspect 18: The method of any of aspects 16 through 17, further comprising: receiving a control message indicating a change to the orientation of the UE via uplink control information, a medium access control control element, or both.

Aspect 19: The method of any of aspects 16 through 18, further comprising: receiving a message including a recommendation for the UE to report measurements for an initial subset of receive beams and for the network entity to predict measurements for a second subset of receive beams.

Aspect 20: The method of aspect 19, further comprising: transmitting, to the UE, a control message indicating for the UE to report measurements for the first subset of receive beams, wherein the one or more measurement reports are for the first subset of receive beams instead of the initial subset of receive beams based at least in part on the control message.

Aspect 21: The method of any of aspects 19 through 20, wherein the first subset of receive beams is the initial subset of receive beams.

Aspect 22: The method of any of aspects 16 through 21, further comprising: transmitting, based at least in part on the one or more measurement reports, a message activating a transmission configuration indicator (TCI) state for a receive beam of a beam pair for the UE to receive a downlink shared channel message.

Aspect 23: The method of aspect 22, wherein transmitting the message indicating the TCI state comprises: transmitting the message indicating a confidence level for the receive beam.

Aspect 24: The method of aspect 23, further comprising: receiving a measurement report for the receive beam based at least in part on a confidence level for the receive beam failing to satisfy a threshold.

Aspect 25: The method of any of aspects 23 through 24, further comprising: receiving control signaling indicating a downlink reference signal confidence level.

Aspect 26: The method of any of aspects 23 through 25, wherein the confidence level for the receive beam is based at least in part on a standard deviation of a predicted mean reference signal received power for the receive beam.

Aspect 27: The method of any of aspects 22 through 26, wherein the message includes a time window for the UE to communicate using the receive beam of the beam pair.

Aspect 28: The method of any of aspects 16 through 27, wherein the parameters include at least a first set of parameters for a set of wide beams and at least a second set of parameters for a set of narrow beams, one or more narrow beams are super-positioned with a wide beam.

Aspect 29: An apparatus for wireless communications at a UE, comprising a processor; memory coupled with the processor; and instructions stored in the memory and executable by the processor to cause the apparatus to perform a method of any of aspects 1 through 15.

Aspect 30: An apparatus for wireless communications at a UE, comprising at least one means for performing a method of any of aspects 1 through 15.

Aspect 31: A non-transitory computer-readable medium storing code for wireless communications at a UE, the code comprising instructions executable by a processor to perform a method of any of aspects 1 through 15.

Aspect 32: An apparatus for wireless communications at a network entity, comprising a processor; memory coupled with the processor; and instructions stored in the memory and executable by the processor to cause the apparatus to perform a method of any of aspects 16 through 28.

Aspect 33: An apparatus for wireless communications at a network entity, comprising at least one means for performing a method of any of aspects 16 through 28.

Aspect 34: A non-transitory computer-readable medium storing code for wireless communications at a network entity, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

a processor;

memory coupled with the processor; and instructions stored in the memory and executable by the processor to cause the apparatus to:

transmit control signaling indicating parameters for a set of receive beams at the UE, the parameters based at least in part on an orientation of the UE and a hierarchical beam width configuration of the set of receive beams;

measure one or more reference signals using a first subset of receive beams of a first set of beam pairs based at least in part on the parameters; and transmit one or more measurement reports for the first subset of receive beams based at least in part on measuring the one or more reference signals.

2. The apparatus of claim 1, wherein the instructions to transmit the control signaling are executable by the processor to cause the apparatus to:

transmit the control signaling indicating beam directions for the set of receive beams and beam widths for the set of receive beams based at least in part on the orientation of the UE and the hierarchical beam width configuration.

3. The apparatus of claim 1, wherein the instructions are further executable by the processor to cause the apparatus to:

transmit a control message indicating a change to the orientation of the UE via uplink control information, a medium access control control element, or both.

4. The apparatus of claim 1, wherein the instructions are further executable by the processor to cause the apparatus to:

transmit a message including a recommendation for the UE to report measurements for an initial subset of receive beams and for a network entity to predict measurements for a second subset of receive beams.

5. The apparatus of claim 4, wherein the instructions are further executable by the processor to cause the apparatus to:

receive, from the network entity, a control message indicating for the UE to report measurements for the first subset of receive beams, wherein the one or more reference signals are measured for the first subset of receive beams instead of the initial subset of receive beams based at least in part on the control message.

6. The apparatus of claim 4, wherein the first subset of receive beams is the initial subset of receive beams.

7. The apparatus of claim 4, wherein the instructions to transmit the message are executable by the processor to cause the apparatus to:

transmit the message via an uplink control information message, a medium access control element, or a radio resource control message.

8. The apparatus of claim 1, wherein the instructions are further executable by the processor to cause the apparatus to:

receive, based at least in part on the one or more measurement reports, a message activating a transmission configuration indicator (TCI) state for a receive beam of a beam pair to receive a downlink shared channel message.

9. The apparatus of claim 8, wherein the instructions to receive the message indicating the TCI state are executable by the processor to cause the apparatus to:

receive the message indicating a confidence level for the receive beam.

10. The apparatus of claim 9, wherein the instructions are further executable by the processor to cause the apparatus to:

measure a second one or more reference signals using the receive beam based at least in part on the confidence level for the receive beam failing to satisfy a threshold; and transmit a measurement report for the receive beam based at least in part on measuring the second one or more reference signals.

11. The apparatus of claim 9, wherein the instructions are further executable by the processor to cause the apparatus to:

receive control signaling indicating a downlink reference signal confidence level.

12. The apparatus of claim 9, wherein the confidence level for the receive beam is based at least in part on a standard deviation of a predicted mean reference signal received power for the receive beam.

13. The apparatus of claim 8, wherein the message includes a time window for communicating using the receive beam of the beam pair.

14. The apparatus of claim 1, wherein:

the parameters include at least a first set of parameters for a set of wide beams and at least a second set of parameters for a set of narrow beams, wherein one or more narrow beams are super-positioned with a wide beam.

15. The apparatus of claim 1, wherein the orientation of the UE is indicated based at least in part on a local coordinate system format or a global coordinate system format, or both.

16. An apparatus for wireless communications at a network entity, comprising:

a processor;

memory coupled with the processor; and instructions stored in the memory and executable by the processor to cause the apparatus to:

receive control signaling indicating parameters for a set of receive beams at a user equipment (UE), the parameters based at least in part on an orientation of the UE and a hierarchical beam width configuration of the set of receive beams;

transmit one or more reference signals using a first subset of transmit beams of a first set of beam pairs based at least in part on the parameters; and receive one or more measurement reports for a first subset of receive beams based at least in part on the one or more reference signals.

17. The apparatus of claim 16, wherein the instructions to receive the control signaling are executable by the processor to cause the apparatus to:

receive the control signaling indicating beam directions for the set of receive beams and beam widths for the set of receive beams based at least in part on the orientation of the UE and the hierarchical beam width configuration.

18. The apparatus of claim 16, wherein the instructions are further executable by the processor to cause the apparatus to:

receive a control message indicating a change to the orientation of the UE via uplink control information, a medium access control control element, or both.

19. The apparatus of claim 16, wherein the instructions are further executable by the processor to cause the apparatus to:

receive a message including a recommendation for the UE to report measurements for an initial subset of receive beams and for the network entity to predict measurements for a second subset of receive beams.

20. The apparatus of claim 19, wherein the instructions are further executable by the processor to cause the apparatus to:

transmit, to the UE, a control message indicating for the UE to report measurements for the first subset of receive beams, wherein the one or more measurement reports are for the first subset of receive beams instead of the initial subset of receive beams based at least in part on the control message.

21. The apparatus of claim 19, wherein the first subset of receive beams is the initial subset of receive beams.

22. The apparatus of claim 16, wherein the instructions are further executable by the processor to cause the apparatus to:

transmit, based at least in part on the one or more measurement reports, a message activating a transmission configuration indicator (TCI) state for a receive beam of a beam pair for the UE to receive a downlink shared channel message.

23. The apparatus of claim 22, wherein the instructions to transmit the message indicating the TCI state are executable by the processor to cause the apparatus to:

transmit the message indicating a confidence level for the receive beam.

24. The apparatus of claim 23, wherein the instructions are further executable by the processor to cause the apparatus to:

receive a measurement report for the receive beam based at least in part on a confidence level for the receive beam failing to satisfy a threshold.

25. The apparatus of claim 23, wherein the instructions are further executable by the processor to cause the apparatus to:

receive control signaling indicating a downlink reference signal confidence level.

26. The apparatus of claim 23, wherein the confidence level for the receive beam is based at least in part on a standard deviation of a predicted mean reference signal received power for the receive beam.

27. The apparatus of claim 22, wherein the message includes a time window for the UE to communicate using the receive beam of the beam pair.

28. The apparatus of claim 16, wherein:

the parameters include at least a first set of parameters for a set of wide beams and at least a second set of parameters for a set of narrow beams, wherein one or more narrow beams are super-positioned with a wide beam.

29. A method for wireless communications at a user equipment (UE), comprising:

transmitting control signaling indicating parameters for a set of receive beams at the UE, the parameters based at least in part on an orientation of the UE and a hierarchical beam width configuration of the set of receive beams;

measuring one or more reference signals using a first subset of receive beams of a first set of beam pairs based at least in part on the parameters; and transmitting one or more measurement reports for the first subset of receive beams based at least in part on measuring the one or more reference signals.

30. A method for wireless communications at a network entity, comprising:

receiving control signaling indicating parameters for a set of receive beams at a user equipment (UE), the parameters based at least in part on an orientation of the UE and a hierarchical beam width configuration of the set of receive beams;

transmitting one or more reference signals using a first subset of transmit beams of a first set of beam pairs based at least in part on the parameters; and receiving one or more measurement reports for a first subset of receive beams based at least in part on the one or more reference signals.

* * * * *